United States Patent [19]
Lu et al.

[11] Patent Number: 5,761,195
[45] Date of Patent: *Jun. 2, 1998

[54] METHODS AND APPARATUS FOR CONNECTING CALLS IN A HIERARCHICAL CELLULAR NETWORK

[75] Inventors: Priscilla Marilyn Lu, San Carlos; Timothy Richard White, Palo Alto, both of Calif.

[73] Assignee: interWAVE Communications International, Ltd., Hamilton, Bermuda

[*] Notice: The term of this patent shall not extend beyond the expiration date of Pat. No. 5,577,029.

[21] Appl. No.: 705,975

[22] Filed: Aug. 30, 1996

Related U.S. Application Data

[63] Continuation of Ser. No. 435,838, May 4, 1995, Pat. No. 5,577,029.

[51] Int. Cl.⁶ .................................................. H04Q 7/22
[52] U.S. Cl. .................. 370/329; 370/338; 455/445
[58] Field of Search ................................ 370/310, 328, 370/329, 338, 465, 466; 455/33.1, 53.1, 54.1, 56.1, 422, 434, 445; 379/58, 59

[56] References Cited

U.S. PATENT DOCUMENTS

| | | | |
|---|---|---|---|
| 4,726,014 | 2/1988 | Goldman et al. | 370/58 |
| 5,157,709 | 10/1992 | Ohteru | 379/58 |
| 5,386,466 | 1/1995 | Bales et al. | 379/220 |
| 5,442,633 | 8/1995 | Perkins et al. | 370/94.1 |
| 5,479,483 | 12/1995 | Furuya et al. | 379/60 |
| 5,504,804 | 4/1996 | Widmark et al. | 379/63 |
| 5,506,837 | 4/1996 | Söllner et al. | 370/31 |
| 5,506,887 | 4/1996 | Emery et al. | 379/58 |
| 5,512,884 | 4/1996 | Hesse et al. | 340/825.03 |
| 5,528,664 | 6/1996 | Slekys et al. | 379/58 |
| 5,528,668 | 6/1996 | Aihara | 379/60 |
| 5,577,031 | 11/1996 | Smith | 370/58.1 |

FOREIGN PATENT DOCUMENTS

| | | | |
|---|---|---|---|
| 462 727 A2 | 12/1991 | European Pat. Off. | H04Q 7/04 |
| 462 728 A2 | 12/1991 | European Pat. Off. | H04Q 7/04 |
| 566 407 A2 | 10/1993 | European Pat. Off. | H04Q 7/04 |
| 587 211 A2 | 3/1994 | European Pat. Off. | H04Q 7/04 |
| 595 392 A1 | 5/1994 | European Pat. Off. | H04Q 7/04 |
| 600 681 A1 | 6/1994 | European Pat. Off. | H04Q 7/26 |
| 605 086 A1 | 7/1994 | European Pat. Off. | H04Q 7/04 |
| 605 311 A1 | 7/1994 | European Pat. Off. | H04B 7/26 |
| WO93/11625 | 6/1993 | WIPO | H94M 11/00 |
| WO94/05126 | 3/1994 | WIPO | H04Q 7/04 |
| WO94/26073 | 11/1994 | WIPO | H04Q 7/04 |
| WO95/24789 | 9/1995 | WIPO . | |

OTHER PUBLICATIONS

J.B. Hollis, "*Air Interface, Protocols for a National Mobile Data Network,*" IEE Collq. (1993) No. 003: Cordless Computing—Systems User Experience, pp. 1–5.

*Primary Examiner*—Hassan Kizou
*Attorney, Agent, or Firm*—Beyer & Weaver, LLP.

[57] ABSTRACT

An apparatus for cross-connecting an end-to-end connection between an origination mobile station and a destination mobile station in a network of cross-connect nodes, which includes a call control circuit. The call control circuit includes a first circuit portion for receiving call control information from the origination mobile station and the destination mobile station and a second circuit portion for determining, responsive to receiving the call control information from the origination mobile station and the destination mobile station, an optimum end-to-end connection for cross-connecting the end-to-end connection through the network of cross-connect nodes. The optimum end-to-end connection represents a computed shortest communication route between the origination mobile station and the destination mobile station that satisfies resource requirements for cross-connecting the end-to-end connection.

31 Claims, 15 Drawing Sheets

METHODS AND APPARATUS FOR CONNECTING CALLS IN A HIERARCHICAL CELLULAR NETWORK

This patent application is a continuation of commonly-assigned U.S. patent application entitled "Cellular Communication Network Having Intelligent Switching Nodes" Ser. No. 08/435,838, filed May 4, 1995 and issued as U.S. Pat. No. 5,577,029 on Nov. 19, 1996 by the same inventors herein.

INCORPORATION BY REFERENCE

The following U.S. patent applications are incorporated by reference herein.

"Cellular Communication Network Having Intelligent Switching Nodes" U.S. Ser. No. 08/435,838, commonly assigned and filed May 4, 1995 and issued as U.S. Pat. No. 5,577,029 on Nov. 19, 1996.

"Cellular Private Branch Exchanges" U.S. Ser. No. 08/435,709, commonly assigned and filed May 4, 1995.

"Cellular Base Station with Intelligent Call Routing" U.S. Ser. No. 08/434,598, commonly assigned and filed May 4, 1995.

"Cellular Adjunct to Public Wired Network", U.S. Provisional Patent Application No. 60/006,454, filed Nov. 10, 1995.

"Hybrid Cellular Communication Apparatus and Method", U.S. Provisional Patent Application No. 60/006,589, filed Nov. 10, 1995.

"Configuration Independent Methods and Apparatus for Software Communication in a Cellular Network", U.S. Provisional Application No. 60/006,455, filed Nov. 10, 1995.

For ease of reference, a glossary of terms and abbreviations is provided herewith as Appendix A.

BACKGROUND OF THE INVENTION

The present invention relates to apparatuses and methods for cellular communication. More specifically, the present invention relates to apparatuses and methods for intelligently cross-connecting bearer data paths between two cellular handsets at lower levels of a cellular network hierarchy.

In the traditional cellular communication system, such as one utilizing the Global Systems for Mobile Communication (GSM) protocol, the mobility management function (MM) is typically centralized at the Mobile-services Switching Center (MSC). It in turn provides a packet communications path between call control (CC), supplemental services (SS), short message services (SMS) and the mobile stations (MS units), also known as the cellular handsets. The call control (CC) function typically performs the call setup, which includes call switching, and the supplemental services (SS) function provides supplemental services to the MS units. As the name implies, the short message services (SMS) provides short message services to the MS units.

The traditional GSM network typically provides a public MSC for controlling a large geographical area. MS units within this geographical area connect to the public MSC for their mobility management, call control, supplemental services, and short message services needs.

In the prior art, the bearer data channel path that makes up part of the actual call path from each MS unit is backhauled all the way up to the public MSC. At the public MSC, it either enters the public wired network or is cross-connected with another bearer data channel path from another MS unit for the purpose of completing an end-to-end connection. This is because the public MSC of the prior art both has access to subscriber information and contains the actual call switching circuit for effecting the required cross-connection when an MS unit dials a telephone number associated with another MS unit. The functions of the call switching circuit includes, for example, routing based on the telephone number dialed.

To facilitate discussion, FIG. 1 shows in a simplified format a traditional GSM cellular communication network including public MSC 200, BSC's 202 and 204, and BTS's 206, 208, and 210. BSC 202 controls BTS 206, while BSC 204 controls BTS's 208 and 210. FIG. 1 also shows a plurality of MS units 220, 222, 224, 226, and 228. MS units 220 and 222 are controlled by BTS 206, MS units 224 and 226 by BTS 208, and MS unit 228 by BTS 210.

When MS unit 220 wants to build a call to MS unit 228 in the prior art, the mobility management session is built from MS unit 220 to public MSC 200 via BTS 206 and BSC 202. The destination phone number supplied by MS unit 220 enables public MSC 200 to locate MS 228 and then build a mobility management (MM) session to MS unit 228 via BSC 204 and BTS 210. Thereafter, the outgoing call path is built from MS unit 220 to public MSC 200 while the incoming call path is built from public MSC 200 to MS unit 228. The incoming and outgoing call paths are then cross-connected at public MSC 200 to complete the end-to-end connection.

When MS unit 220 desires to call MS unit 222 in the prior art, both the MM sessions and the call paths associated with these two MS units are built all the way to public MSC 200, where the connection cross-connect between the incoming and the outgoing paths occur. Likewise, when MS unit 224 wishes to call MS unit 228, both the MM sessions and the call paths associated with these two MS units are also built all the way to public MSC 200 to be cross-connected therein. In sum, the prior art requires that both the MM sessions and the call paths from MS units that participate in a call be built all the way to the public MSC in order for the call paths to be cross-connected, thereby completing the end-to-end connection. As is apparent from FIG. 1, neither of the above-discussed end-to-end connection via public MSC 200 represents the shortest route between the MS units participating in the call.

As the term is used herein, a cross-connect represents the creation of a data path across one node which allows data to flow from one end, e.g., from an input source, to another end, e.g. to an output source. The data path may optionally pass through resources. For example, the data path in a GSM implementation may pass through a TRAU. Further, the term end-to-end connection represents the connection of one phone to another, including all cross-connections within nodes that the end-to-end connection traverses as well as intervening facilities. A path, on the other hand, represents a piece of an end-to-end connection. Examples of paths include incoming telephone paths, outgoing telephone paths, upstream paths, and downstream paths.

As the term is used herein, a downstream path is defined from the perspective of the "current node" and refers to the piece of the path through the current node and all other nodes and facilities in the path from that node to the MS. Conversely, the upstream path refers to the piece of the path through the current node and all other nodes and facilities in the path from that node to the node which performs the cross connect between the incoming and outgoing call paths.

A path cross-connect refers to all the nodal cross-connects and the intervening facilities in the path. In contrast, a connection cross-connect refers to the cross-connection between the incoming call path and the outgoing call path across a single node.

The use of a public MSC to cross-connect bearer data circuits among MS units for the purpose of building calls has certain disadvantages. For example, the prior art public MSC, due to the prior art centralized switching approach, typically has a large domain and controls the cross-connecting of MS units in a wide geographical area. By way of example, it is not unheard of for an MSC to be located hundreds of miles from a BTS within its domain while bearing the sole responsibility for cross-connecting through it all calls involving MS units in its domain.

It has been recognized, however, that a large percentage, up to 50–75% in some cases, of calls made by an average user typically involves a destination MS unit located a short distance away from the caller. In some market, such as remote villages in developing countries or isolated communities or factories, for example, it has been determined that most calls are typically made to shops, homes, and facilities within a small radius of the calling unit, with a rather small percentage of calls being made over any appreciable distance (over 50 miles). Consequently, the prior art requirement of backhauling bearer data channels from MS units all the way back to a public MSC for cross-connection represents a wasteful use of the network bandwidth. This is especially true when an MS unit, which is located some distance away from the prior art public MSC, wishes to call a destination MS unit located nearby, which destination MS unit is also in the domain of the same public MSC. In this case, the prior art disadvantageously requires the bearer data paths to be backhauled all the way back to the central public MSC for cross-connection. Because of the prior art centralized switching approach, which centralizes the connection cross-connect function at the public MSC, the number of calls that can be handled by the prior art network is necessarily limited by the number of calls that can be cross-connected simultaneously by the prior art central switching public MSC and by the capacity of the facilities to that MSC.

Further, current implementations of MS units may send and receive data at different rates, say 8 Kbits, 16 Kbits or even 32 Kbits. As is well known to those of skill in the art, the bandwidth and voice or data encoding of MS units that communicate at different rates must be harmonized before their call paths can be cross-connected. Furthermore, current implementations of the public network, whether Public Switched Telephone Network (PSTN) or Public Land-based Mobile Network (PLMN), typically send and receive time division multiplexed data (TDM) at a fixed rate, say 64 Kbits. To accomplish end-to-end connection cross-connect, the prior art GSM system performs rate conversions (typically using a Transcoder Rate Adapter Unit, hence the name TRAU) on data from all MS units, whether or not they communicate at the same or different rates, by converting them to 64k bits. After the conversion, the 64 Kbits TDM data may be backhauled to the public MSC, using the network resources, for cross-connection therein.

It is known that TRAUing to perform rate conversions degrades communication quality and increases the network computational overhead. As mentioned before, TRAUing is performed in the prior art on data from and to MS units regardless whether they communicate at the same or different rates. It is recognized, however, that significant improvement on communication quality and optimizing of network computational resources may be achieved when unnecessary TRAUing, e.g. for calls between MS units that communicate at the same rate, can be eliminated.

Consequently, what is desired is a method and apparatus for reducing the amount of backhauling required in the prior art cellular communication system for cross-connecting call paths. In accordance with one aspect of the present invention, the inventive apparatus and method intelligently determines an optimum end-to-end connection and preferably accomplishes connection cross-connects of call paths at downstream nodes, i.e. lower levels in the network hierarchy, thereby reducing the distance by which data from MS units must be carried for completing the end-to-end cross-connection. In accordance with a further aspect of the present invention, the inventive apparatus and method preferably eliminates unnecessary usage of resources, such as TRAU, for the completion of end-to-end connections when those resources are not needed. When those resources are required, however, the inventive apparatus and method preferably switches them in as necessary at appropriate locations along the optimum end-to-end connection in order to properly complete the connection between MS units.

SUMMARY OF THE INVENTION

The present invention relates to, in one embodiment, a method of cross-connecting an end-to-end connection between an origination mobile station and a destination mobile station in a system having a plurality of cross-connect nodes for facilitating cellular communication among a plurality of mobile stations.

The method includes receiving call control information from the origination mobile station, receiving call control information from the destination mobile station, and computing, responsive to the call control information received from the origination mobile station and the call control information received from the destination mobile station, an optimum end-to-end connection for cross-connecting the end-to-end connection.

Further, the optimum end-to-end connection has a first optimum cross connect point and represents a computed shortest communication route between the origination mobile station and the destination mobile station that satisfies resource requirements for cross-connecting the end-to-end connection. The method further includes the step of cross-connecting the end-to-end connection through the first optimum cross-connect point.

In another embodiment, the invention relates to an apparatus for facilitating cellular communication between an origination mobile station and a destination mobile station, which includes a mobile services switching center, the mobile services center having a first switching circuit for performing connection cross-connects for calls between the origination mobile station and the destination mobile station.

The apparatus further includes a call control circuit coupled to the mobile services switching center, the call control circuit receiving call control information from the origination mobile station and the destination mobile station. Moreover, the apparatus includes a base station controller coupled to the mobile services switching center, the base station controller having a second switching circuit for performing connection cross-connects for calls between the origination mobile station and the destination mobile station.

Furthermore, there is included a base transceiver station coupled to the base station controller, the base transceiver station having a third switching circuit for performing connection cross-connects for calls between the origination mobile station and the destination mobile station, wherein the call control circuit determines, responsive to the call control information received from the origination mobile station and the destination mobile station, at which of the mobile services switching center, base station controller, and base transceiver station an optimum cross connect point for cross-connecting an end-to-end connection between the origination mobile station and the destination mobile station resides.

These and other features of the present invention will be presented in more detail in the following specification of the invention, the figures, and the appended claims.

BRIEF DESCRIPTION OF THE DRAWINGS

Additional advantages of the invention will become apparent upon reading the following detailed description and upon reference to the drawings, in which.

DESCRIPTION OF THE PREFERRED EMBODIMENT

Figure 1:
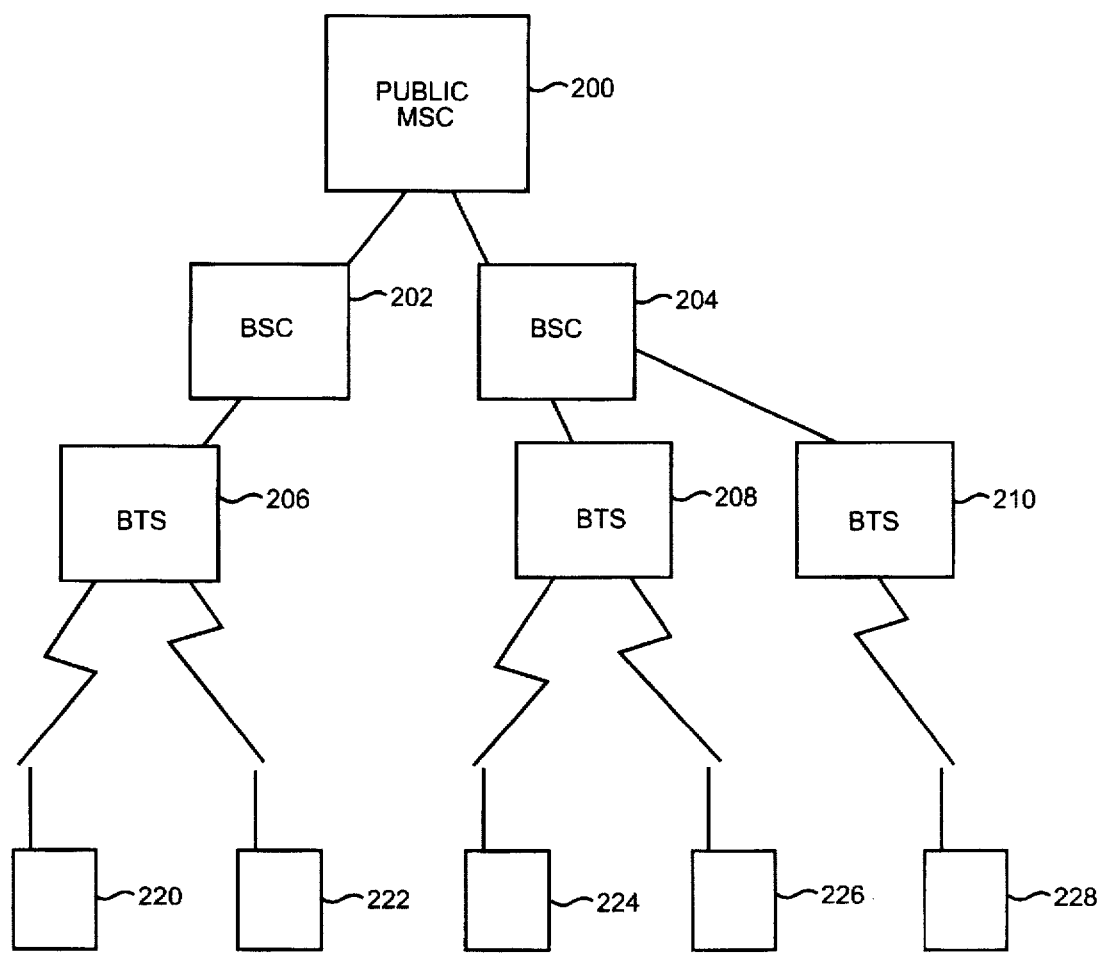
FIG. 1 shows in a simplified format a traditional GSM cellular communication network including a public MSC, a plurality of BSC's, and a plurality of BTS's.
Figure 2A:
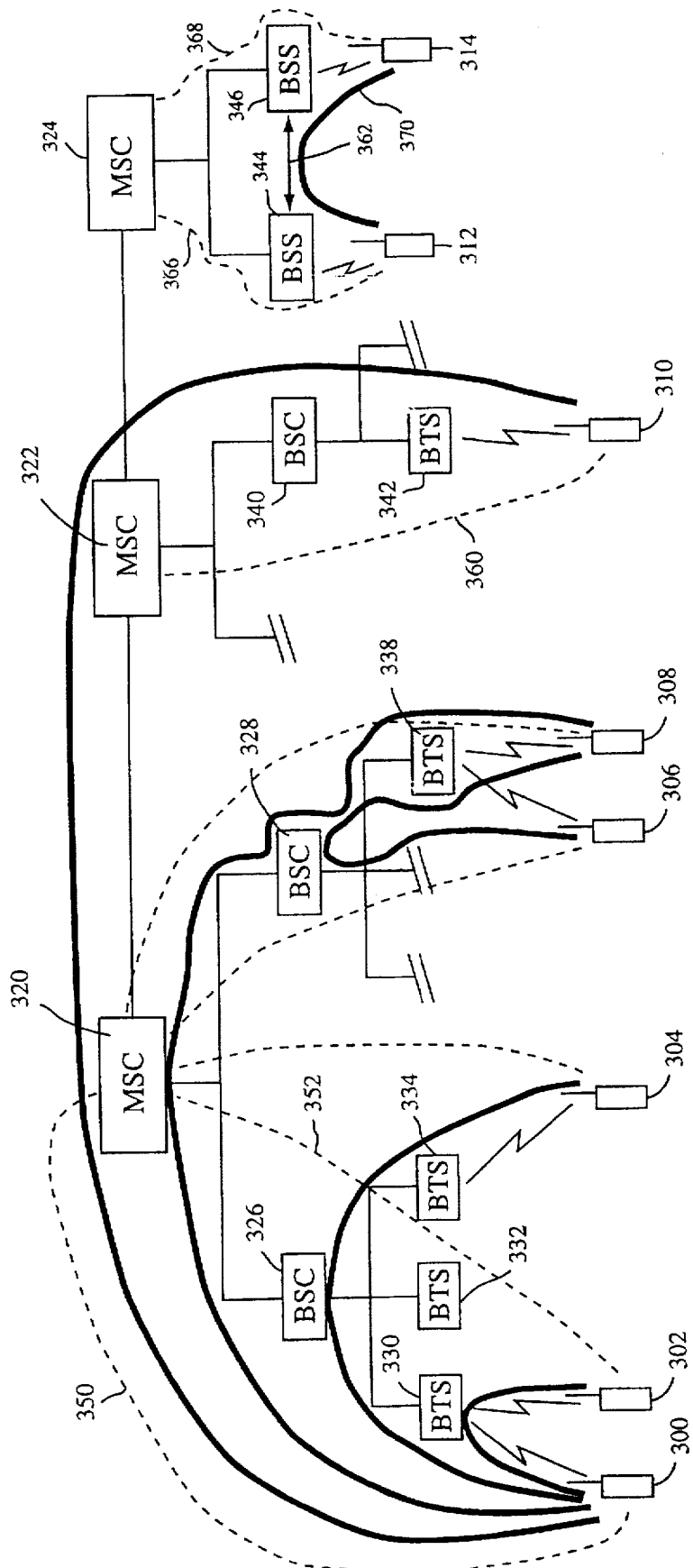
FIG. 2A shows in a simplified format the MM sessions and the possible end-to-end connections in accordance with one aspect of the present invention.

FIG. 2A shows in a simplified format the MM sessions and the possible end-to-end connections in accordance with one aspect of the present invention. Referring now to FIG. 2A, there is shown a plurality of MS units 300, 302, 304, 306, 308, 310, 312, and 314. The eight MS units shown represent only a small subset of the MS units that may be controlled by MSC's 320, 322, and 324. MSC's 320, 322, and 324 are shown in FIG. 2A to be interconnected in a network of MSC's although such is not a requirement, and in accordance with one aspect of the present invention, the present inventive method and apparatus works equally well with a standalone MSC subnetwork. In one embodiment, each of MSC's 320, 322, and 324 may represent a private MSC for implementing a private cellular network. For further information regarding private cellular networks, reference may be made to the aforementioned patent application entitled "Cellular Private Branch Exchanges" (U.S. Ser. No. 08/435,709).

In FIG. 2A, MSC 320 is further shown controlling two BSC's 326 and 328. BSC 326 in turn controls three BTS's 330, 332, and 334. BTS 330 controls MS units 300 and 302 while BTS unit 334 controls MS unit 304.

BSC 328 controls BTS 338, which in turn controls MS units 306 and 308. MSC 322 controls a BSC 340, which in turns control a BTS 342. Further, as shown in FIG. 2A, BTS 342 controls MS unit 310. MSC 324 is shown to be in control of base station subsystem (BSS) units 344 and 346. In accordance with one aspect of the present invention, each of the BTS, BSC, BSS, and MSC subsystems represent a cross-connect node, potentially capable of performing either the path cross-connect task or the connection cross-connect task.

A base station subsystem, such as BSS 344, includes one BSC and all the BTS's that it controls. BSS 344 controls MS unit 312 while BSS 346 controls MS unit 314 as shown in FIG. 2A When MS unit 300 wishes to call MS unit 302, the mobility management (MM) session is preferably built all the way to the MSC that controls it, i.e. MSC 320. The MM session between MS unit 300 and MSC unit 320 is shown representatively by a dashed line 350. Once MSC 320 receives the destination phone number supplied by MS unit 300, it builds an MM session all the way to the destination phone, i.e. MS unit 302, via BSC 326 and BTS 330. The MM session from MSC 320 and MS unit 302 is shown representatively by dashed line 352.

However, in accordance with one aspect of the present invention, the connection cross-connect between the outgoing path (from MS unit 300) and the incoming path (to MS unit 302) is cross-connected at BTS 330, which is a lower level in the hierarchy than MSC 320. Similarly, calls from MS unit 300 to MS unit 304 have their call paths cross-connected at BSC 326, representing a connection cross-connect node which is lower in the hierarchy than MSC 320 although the MM sessions to and from these MS units are preferably built all the way to MSC 320.

For the sake of discussion, assume that MS unit 306 and MS unit 308 communicate at different rates. Further, assume for the purpose of discussion that the rate conversion resources are not available at BTS unit 338. Instead, they are provided at BSC unit 328. In this case, the MM sessions to and from MS units 306 and 308 are still preferably built all the way to the MSC that controls them, i.e. MSC 320. In accordance with one aspect of the invention, however, the actual cross-connection between the incoming path and the outgoing path is not made along the shortest end-to-end connection (e.g. connection cross-connect via BTS 338). Instead the present invention, in one embodiment, preferably cross-connects the incoming and the outgoing call paths at a cross-connection node where the resources are available, i.e. at BSC 328.

MSC 320 and MSC 322 are interconnected in a multi-site overlay network. When an MS unit 300 wishes to call MS unit 310, it builds an MM session to MSC 320 via the aforementioned path 350. MSC 320 then forwards the call information to MSC 322, enabling MSC 322 to build an MM session to MS unit 310 via a path 360. The actual cross-connect between the incoming path and the outgoing path is now made via MSC 320 and MSC 322.

In accordance with one aspect of the present invention, the intelligent switching apparatus and method of the present invention applies to both the hierarchical network as well as the mesh-type network. Consider, for example, BSS 344 and BSS 346. BSS 344 is coupled to BSS 346 via a link 362. When an MS unit 312 wishes to call MS unit 314, the MM session from MS unit 312 is again preferably built all the way to the MSC unit that controls it, i.e. MSC 324 (via path 366). MSC 324, responsive to the telephone number supplied by MS unit 312, then builds an MM session to MS unit 314 via path 368. However, if resources are available, the actual cross-connection between the incoming path and the outgoing path between MS units 312 and 314 may be made not through MSC 324 but via BSS 344 and BSS 346 using a path 370 as shown. In this manner, cross-connection between the incoming and outgoing call paths at a lower level of the hierarchy may be accomplished in a mesh-type network. It should be noted that the present invention, in accordance with a preferred aspect, advantageously facilitates intelligent cross-connection whether the mesh-type network is formed via direct connections among MSC's, among BSC's, or among BTS's.

It should be noted that although the terms MSC, BSC, BTS, and BSS are used herein to describe functional blocks of the present invention for ease of reading for those of skill in the art to whom this invention disclosure most nearly pertains, those terms do not connote the MSC, BSC, BTS, and BSS respectively of the prior art. By way of example, each of the MSC, BSC, and BTS of the present invention, unlike the prior art, includes circuitry which is capable of performing a connection cross connect between the incoming path and the outgoing path of a call. This aspect of the invention is discussed extensively in, for example, the aforementioned patent application entitled "Cellular Private Branch Exchanges" (U.S. Ser. No. 08,435,709) and "Cellular Base Station with Intelligent Call Routing" (U.S. Ser. No. 08,434,598). As a further example, each of the MSC, BSC, and BTS of the present invention, unlike the prior art, may include certain resources which may be required for properly cross-connecting some calls, e.g. TRAU resources, echo canceling, and the like. These resources, when available, may be switched in when required to facilitate calls between MS units that require them for a proper completion of the end-to-end connection.

Moreover, it should be noted that these terms do not connote a physical entity. Rather, each describes a functional block. In one embodiment, the functional block making up each of the MSC, BSC, and BTS is formed by properly populating a highly configurable chassis with various circuit "cards." For further details regarding the inventive configurable chassis, reference may be made to, for example, the above-mentioned patent application entitled "Cellular Private Branch Exchanges" (U.S. Ser. No. 08,435,709).

In accordance with one aspect of the invention, some or all of the cross-connect nodes, i.e. the functional blocks referred to herein as MSC, BSC, and BTS, may be provided with resources, e.g. rate adaptation, echo canceling, and the like. Since resources are distributed among the nodes of the inventive network, it is possible to complete an end-to-end connection between two MS units using only nodes at lower levels of the network hierarchy while still satisfying any resource requirements. Rate adaptation (TRAU) resources may be required when, for example, a 8 Kbps MS unit desires to establish communication with a 16 Kbps MS unit. In this example, the present invention advantageously permits sub-64 Kbps switching at lower levels, ie. without utilizing the MSC, if there is a 8 Kbps–16 Kbps TRAU resource at a lower level of the network hierarchy. In this manner, bearer data paths do not always have to be backhauled to the MSC for the purpose of completing the end-to-end cross-connection.

It should be noted that although resources are distributed, it is not required that there must be resources at every node of the network, or that the resources at nodes that have them must be identical. The present invention can still perform its intelligent cross-connection aspect while permitting the network administrator to distribute resources any desired manner. As will be discussed later, the intelligent switching aspect of the present invention dynamically selects, in one embodiment, the optimum end-to-end cross-connection for any two MS units wishing to establish communication based on, among others, 1) the topology data, e.g. the nodes available as well as the resources on each node, (2) the communication characteristics of each MS unit, e.g. its communication rate, and (3) the type of call, e.g. data, voice, fax, or the like. The intelligent switching aspect further dynamically modifies the computed optimum end-to-end cross-connection if, for example, it turns out that the topology data is erroneous in order to attempt to cross-connect the MS units in the most optimum manner givent the resources that are actually available.

Further, the fact that the present invention permits sub-64 Kbps switching advantageously reduces the amount of TRAUing that must be done when MS units communicate with one another. When two MS units having the same communication rate, e.g. 8 Kbps–8 Kbps, 16 Kbps–16 Kbps, or 32 Kbps–32 Kbps, communicate with one another, TRAUing is advantageously omitted in one embodiment. In this case, resources at nodes through which the end-to-end connection traverses are simply not utilized or switched in. On the other hand, when two MS units having different communication rates, e.g. 8 Kbps–16 Kbps, 8 Kbps–32 Kbps, 16 Kbps–32 Kbps, wish to establish communication with one another, the present invention advantageously avoids a rate adaptation to 64 Kbps. For example, when a 8 Kbps MS unit wishes to communicate with a 16 Kbps MS unit, one embodiment provides direct TRAUing from 8 Kbps–16 Kbps without requiring an intermediate 64 Kbps TRAUing step. In other words, it is not necessary to require TRAUing from 8 Kbps–64 Kbps–16 Kbps In this manner, the present invention advantageously reduces the amount of TRAUing that must be done when calls are cross-connected, thereby reducing the overhead associated with TRAUing while improving communication quality.

It should be noted that this disclosure describes in detail the intelligent switching required to accomplish call setup (CC). However, the technique described herein also applies to switching functions associated with SS services. By way of example, short message service (SMS) and supplemental service (SS) requests are still handled by the MSC in one embodiment and conveyed over the MM session between the handsets the MSC.

As a further example, these services sometimes just require messaging across the MM session such as the delivery of a SMS short message. In this case the MSC handles the messaging over the MM session in the manner typically performed in a cellular network.

Often, SS services require that the end-to-end connection be rebuilt such as when a call is to be forwarded or a three-way conference bridge is to be built. The techniques described in this disclosure apply to building these connections as well. Further, the MSC performs call clearing function of any path rendered unnecessary by, for example, a forwarding action.

In some cases, a connection already made internal to the mobile network may need to be rerouted through to an external network, as in the case when a call is forwarded to the public network or to an adjunct wired PBX, or when an international handover occurs. In this case, the MSC builds the connection to itself before proceeding in the manner typically performed in a cellular network in setting up the connection with the external network. Furthermore, it is also possible that the service requests simply modify the current connection such as call hold or mute. In these cases, the MSC simply directs the proper cross-connect node of the mobile network to handle the modification.

Figure 2B:
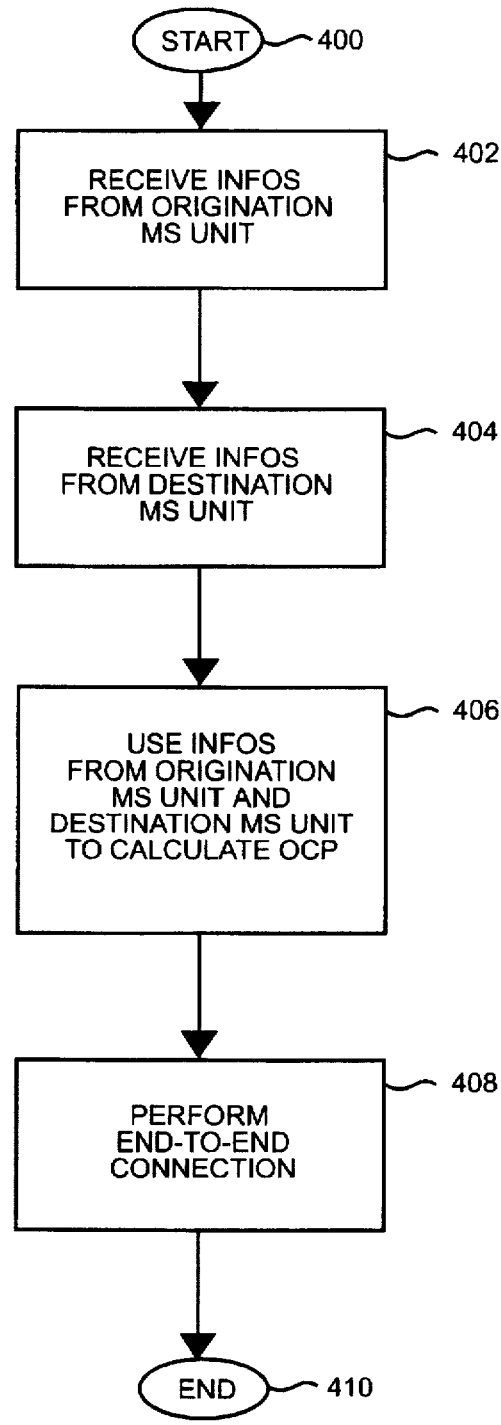
FIGS. 2B shows in a high level flowchart format the steps involved in performing the intelligent cross-connecting in accordance with one aspect of the present invention.
Figure 2C:
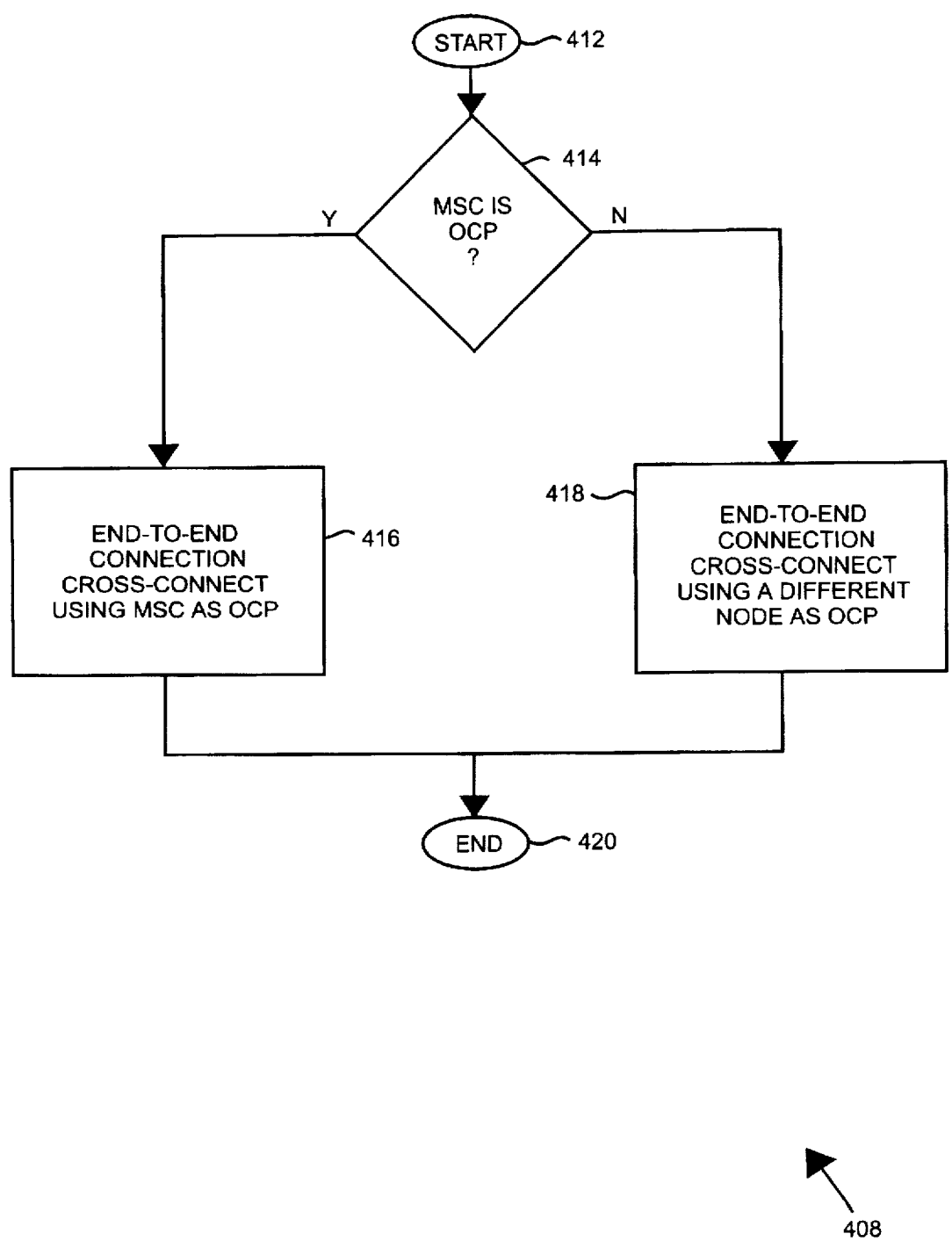
FIG. 2C shows in a simplified format the steps involved in performing the end-to-end connection step of block 408 of FIG. 2B.
Figure 2D:
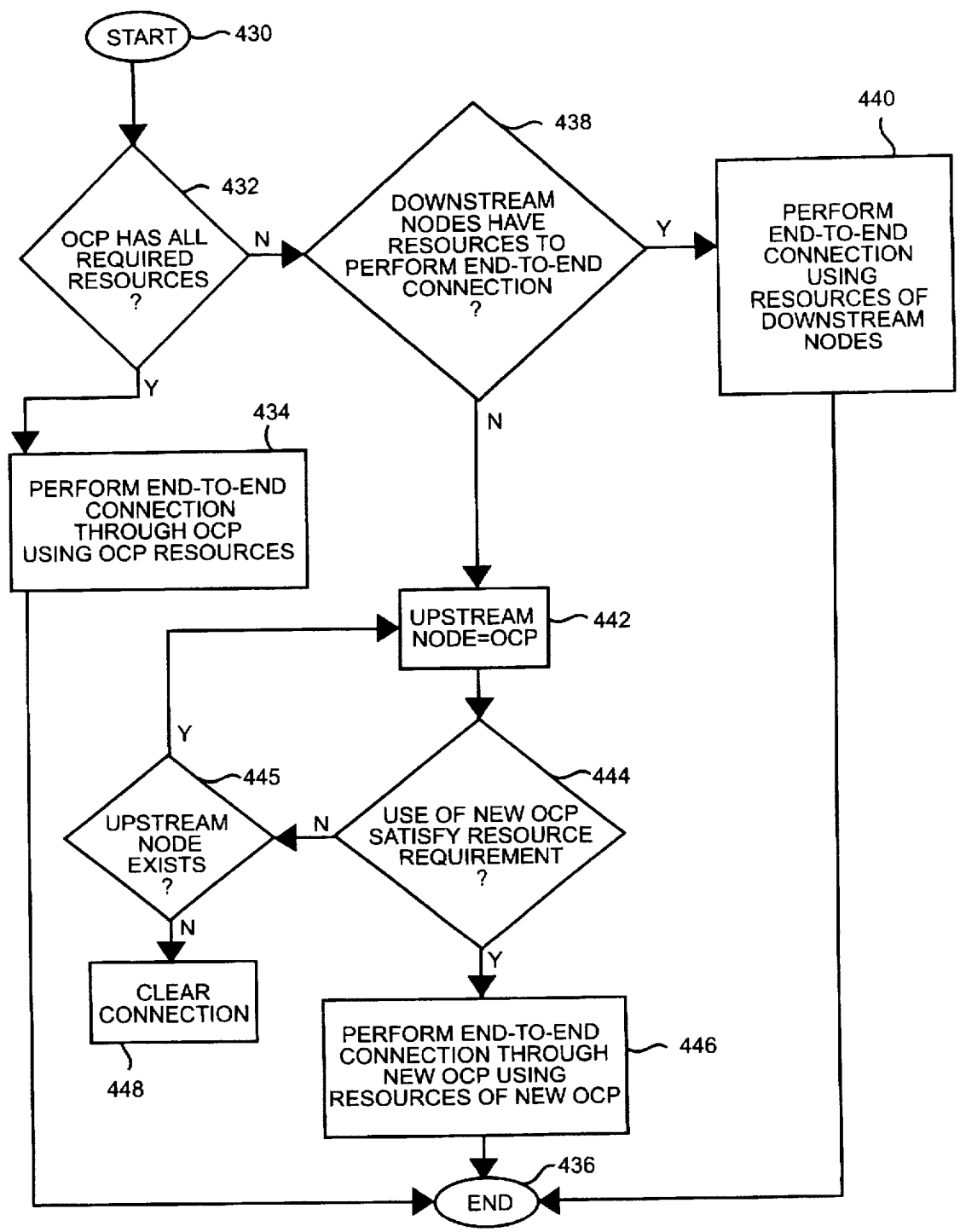
FIG. 2D shows in a simplified format the steps involved in cross-connecting the end-to-end connection through an OCP that is not an MSC.

FIGS. 2B, 2C and 2D show in a high level flowchart format the steps involved in performing intelligent cross-connecting in accordance with one aspect of the present invention. The blocks of FIGS. 2B, 2C, and 2D are described in a high level manner, the details of which should be apparent upon a review of the remaining figures of the present disclosure. FIG. 2B starts at block 400. From block 400, the method proceeds to block 402 wherein the controlling MSC, e.g. the MSC associated with the calling or origination MS unit, receives from the origination MS unit call control information that identifies itself and the resources it needs for communication. From block 402, the method proceeds to block 404 wherein the controlling MSC receives from the destination MS unit call control information that identifies the destination MS unit and the resources it needs for communicating with the origination MS unit.

From block 404, the method proceeds to step 406 wherein the controlling MSC utilizes the call control information received from the origination MS unit and the destination MS unit to calculate the optimum cross-connect point (OCP) in the network. From block 406, the method proceeds to block 408 wherein the nodes of the network are utilized to build the end-to-end connection between the origination and the destination MS units. As will be discussed later in connection with FIGS. 3A, 3B, 4A, 4B, and 4C, the end-to-end connection preferably, but not necessarily, utilizes the OCP determined in block 406 to cross connect the incoming and the outgoing paths.

From block 408, the method proceeds to block 410 where the steps of FIG. 2B end. At block 408, the end-to-end connection between the MS unit is either successfully made or the method has failed to establish the desired connection.

FIG. 2C shows in a simplified format the steps involved in performing the end-to-end connection step of block 408 of FIG. 2B. FIG. 2C starts at block 412. From block 412, the method proceeds to block 414 wherein the method ascertains whether the MSC itself is the designated OCP (as calculated in block 406). If the MSC itself is the OCP (as determined in block 414), the method proceeds to block 416 wherein the end-to-end connection is cross-connected using the MSC as the OCP. However, if the MSC itself is not the designated OCP (as determined in block 414), the method proceeds to block 418 wherein the method performs the end-to-end connection cross-connect using a different node as OCP (as determined from the information from the origination and the destination MS units). In block 418, the method attempts, as will be explained later in greater details in connection with FIGS. 4A, 4B, and 4C, to use the designated OCP as the site at which the connection cross-connect between the incoming and outgoing paths is performed. From either blocks 416 or block 418, the method proceeds to block 420 wherein the steps of FIG. 2C end.

FIG. 2D shows in a simplified format the steps involved in cross-connecting the end-to-end connection through an OCP that is not an MSC. FIG. 2D starts at block 430. From block 430, the method proceeds to block 432 wherein the method checks whether the designated OCP has all the required resources (e.g. TRAU, echo canceling, and the like) on node to properly complete the end-to-end connection. If there are sufficient resources on node, the method proceeds to block 434 wherein the end-to-end connection is cross-connected between the origination MS unit and the destination MS unit using the resources of the designated OCP. From block 434, the method proceeds to block 436 where the steps of FIG. 2D end.

On the other hand, if it is determined that the designated OCP has insufficient resources on node to properly complete the end-to-end connection, the method proceeds from block 432 to block 438 wherein the method determines whether there are sufficient resources at downstream nodes (both the incoming and the outgoing paths) to properly complete the end-to-end connection. If the use of resources found downstream satisfies the resource requirement of the end-to-end connection, the method proceeds from block 438 to block 440 wherein the end-to-end connection is cross-connected, using the resources found at downstream nodes to satisfy the resource requirements of the end-to-end connection. In block 440, the cross-connection between the incoming and the outgoing paths is preferably perform through the designated OCP. From block 440, the method proceeds to block 436 where the steps of FIG. 2D end.

If the use of resources found downstream fails to satisfy the resource requirement of the end-to-end connection, the method connects upward from the OCP to a node upstream of it in order to attempt to find resources there to complete the end-to-end connection. In this case, the method proceeds to block from block 438 to block 442 wherein the upstream node is now designated the OCP.

If there are resources at this upstream node (alone or in combination with nodes downstream of it in the end-to-end connection route), the method proceeds from block 444 to block 446 to perform the end-to-end connection through the newly designated OCP, using resources of that OCP to satisfy the resource requirement of the end-to-end connection. From block 446, the method proceeds to block 436 wherein, as mentioned earlier, the steps of FIG. 2D end.

If it is determined in block 444 that the use of resources at the newly designated OCP still does not satisfy the resource requirements of the end-to-end connection, the method will attempt to find resources at even more upstream node. In this case, the method proceeds to block 445 wherein the method determines if an upstream node exists. If there exists an upstream node, the method proceeds to block 442 to check for resources on that node. If the check in block 445 fails, e.g. when the MSC is the current OCP, the method proceeds to block 448 wherein the connection is cleared. At block 448, the attempt to complete the end-to-end connection cross-connect has failed. Following the clearing of the connection, the method proceeds to block 436 where, as mentioned earlier, the steps of FIG. 2D end.

FIGS. 3–11 show in greater details the steps involved in the intelligent cross-connecting technique in accordance with one aspect of the present invention. FIGS. 3A–B show in a simplified format various steps taken by the call control (CC) circuit within the controlling MSC to direct the call setup in accordance with one aspect of the intelligent switch of the present invention. FIG. 3A starts at block 500. From block 500, the Initial Address Message (IAM) may be received in either block 502 from either outside of the private network, from the MM circuit for calls originating locally, or in block 503 from another MSC within the private network. In block 502, the Initial Address Message (IAM) is received from either a telephone set in the public network, or a wired PBX adjunct. The IAM may also come in from an MS unit locally controlled by this MSC. From step 502, the method proceeds to step 504 to route the call to the appropriate destination phone set.

In one embodiment, step 504 involves the CC function in the MSC determining whether the destination for the call is an MS unit in the private network. If it is determined that the destination for the call is an MS unit in the private network, the CC function in the MSC then sends the private HLR/VLR registry a locate request. By sending the locate request to the HLR/VLR registry, the CC function in the MSC takes the dialed phone number, which it receives in block 502, and consults the HLR/VLR registry for the location of the destination MS unit. The HLR/VLR registry then sends a Locate Response message to the MSC which pinpoints the location of the destination MS unit. The determination of the location of the destination MS unit is important in, for example, a multi-site/overlay private network wherein multiple MSC's may be interconnected and MS units may roam among location areas controlled by the interconnected MSC's.

In block 506, the method determines whether both the incoming and the outgoing paths are internal to the private network. If either the incoming or the outgoing path terminates at a telephone set that is external to the private network, either in the wired PBX adjunct or the public net, the method proceeds to block 508 to terminate the call at the appropriate external destination phone set. When the call is between the external network and an internal MS unit, the CC circuit within the MSC preferably performs no intelligent cross-connection and simply allows the call to pass through. In one embodiment, however, the CC circuit within the MSC may switch in the necessary resources (e.g. TRAU, packet servers for data calls, or the like) for permitting the call to proceed. For further information regarding call termination, reference may be made to the aforementioned "Cellular Private Branch Exchanges" patent application (U.S. Ser. No. 08,435,709) and the GSM references of Appendix B of the present disclosure, all of which are incorporated by reference herein for all purposes.

On the other hand, if both the incoming and the outgoing call paths are internal to the private network, the method proceeds to block 510 wherein an Initial Address Message (IAM') with deferred assignment is sent from the CC circuit within the MSC that receives the IAM message in block 502 to the destination MSC associated with the incoming call (where the destination MS unit is located). In block 510, the destination MSC may be the MSC that receives the IAM message in block 502 (if it is determined in block 504 that the destination MS unit is located in the location area controlled by that MSC). However, the destination MSC in block 510 may also be another MSC in the private network where the destination MS unit has roamed to. Viewed another way, the destination MSC may be the same as the MSC that receives the IAM message in block 502 or another MSC in the private network.

The actual assignment of bearer data channel may be deferred until more information is received regarding the destination phone and the connection path thereto (e.g. what resources are required). Instead of assigning bearer data channel resources early on in the signaling (MM) session, the assignment of the bearer data channel is deferred, in one embodiment, until it is ascertained that there is a phone at the destination and it can be ringed. Deferred assignment is optional and represents a method to saves resources of the network and to improve its bandwidth if the destination MS unit happens to be turned off or when a bad number is dialed. The Initial Address Message sent in block 510 is an IAM' message, indicating that this message is an on-net type of message. The IAM' message is different from the standard GSM IAM message in that it includes additional information to facilitate intelligent cross-connection. For example, an IAM' may include information regarding the originating MS unit, e.g. its communication rate, the resources it requires for a proper cross-connection, or the like.

Block 503 represents the situation where a CC function associated with a controlling MSC has sent an IAM' message as described above. The IAM' message is received in block 503 by the CC circuit within the neighboring MSC. The CC circuit within the neighboring MSC that received the IAM' message in block 503 may be thought of as a forwarder for forwarding the received IAM' message in block 503 to the MM circuit associated with it (block 512). Thereafter, all messages are forwarded between the CC circuit within the neighboring MSC that sent the IAM' message (which is received in block 503) and the MM circuit where the destination MS unit has roamed to.

Figure 3A:
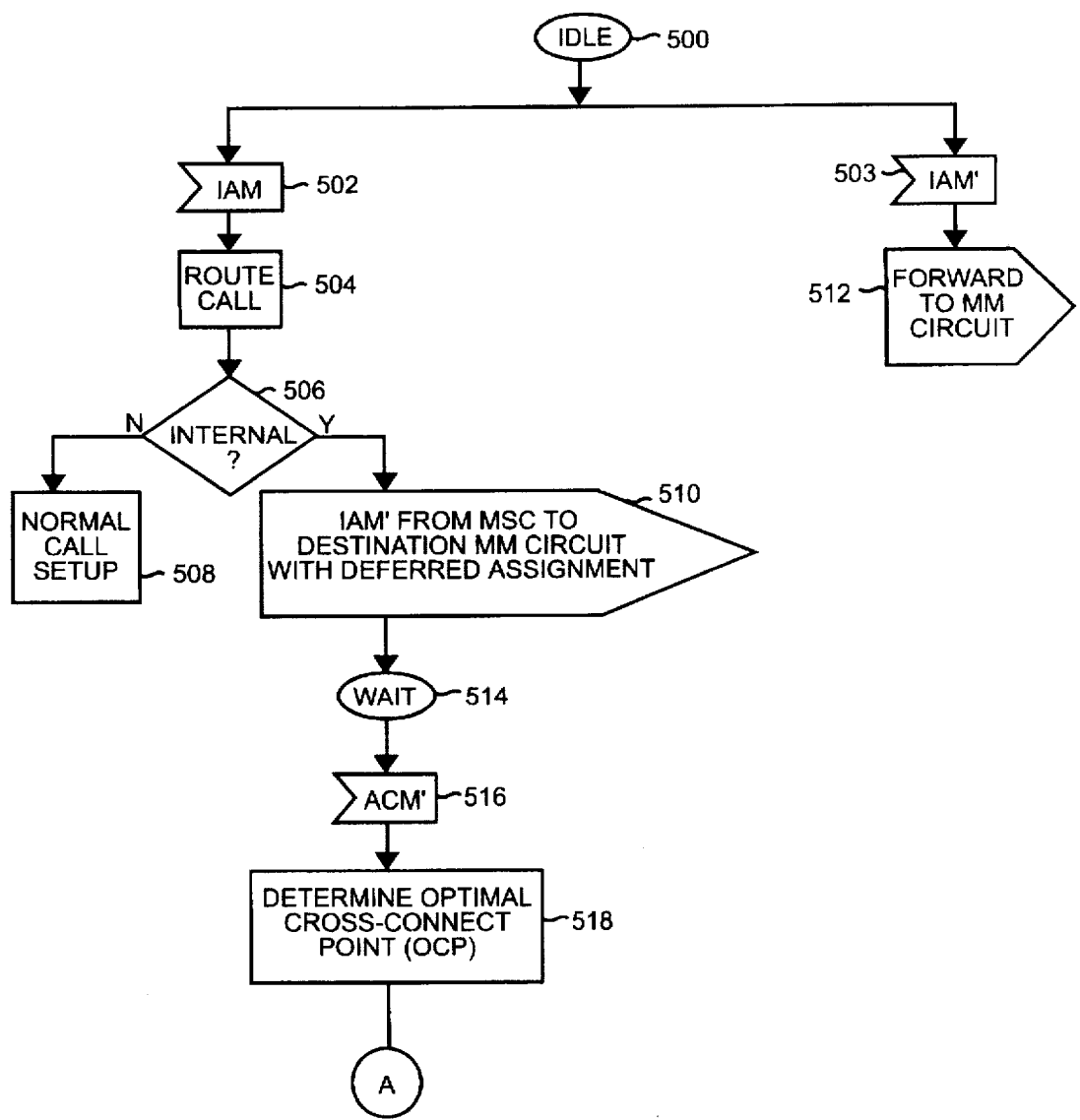
FIG. 3A shows in a simplified format various steps taken by the call control (CC) circuit within the controlling MSC to direct the call setup in accordance with one aspect of the intelligent switch of the present invention.

At any rate, the destination MM circuit receives the IAM' message, in either block 510 or block 512 of FIG. 3A. In block 514, the CC function associated with the controlling MSC waits for the response from the destination MM circuit. In block 516, the CC circuit within the MSC that sent out the IAM' in block 510 (and forwarded via a neighboring MSC, e.g., the CC circuit within the neighboring MSC, if the destination MS unit is an MS unit that is within the location area of that neighboring MSC (whether it has roamed into that neighboring MSC or considers that neighboring MSC its home) receives from the destination MM circuit, i.e., the MM circuit that directly communicates with the destination MS unit, an Address Complete Message (ACM').

The ACM' message signifies that the destination phone is found. Further, the ACM' message is an on-net message, which differs from the standard GSM ACM message in that it further contains information necessary to calculate in a subsequent block 518 the optimum cross-connect point. In one embodiment, the ACM' may include information such as the rate of communication of the destination MS unit (the rate of communication of the origination MS unit is contained in the IAM message received from an on-net MS unit) and any other information regarding the resources that are required to establish communication with the originating MS unit, e.g. TRAU, echo canceling, proper packet server resources if the call is a data call, and other interworking functions (IWF's).

In block 518, the CC circuit within the controlling MSC calculates the optimum cross-connect point (OCP) by first finding the optimum end-to-end connection given the parameters defined by, among others, the network topology, the information contained in the IAM message received in block 502 and the ACM' message received in block 516. The optimum cross-connection point determined in block 518 may be the controlling MSC itself may involve another MSC (for calls between MS units controlled by different MSC's in a private network), or, as is often the case, a subsystem at a lower level in the private network hierarchy, e.g. a BSC or a BTS subsystem.

Figure 3B:
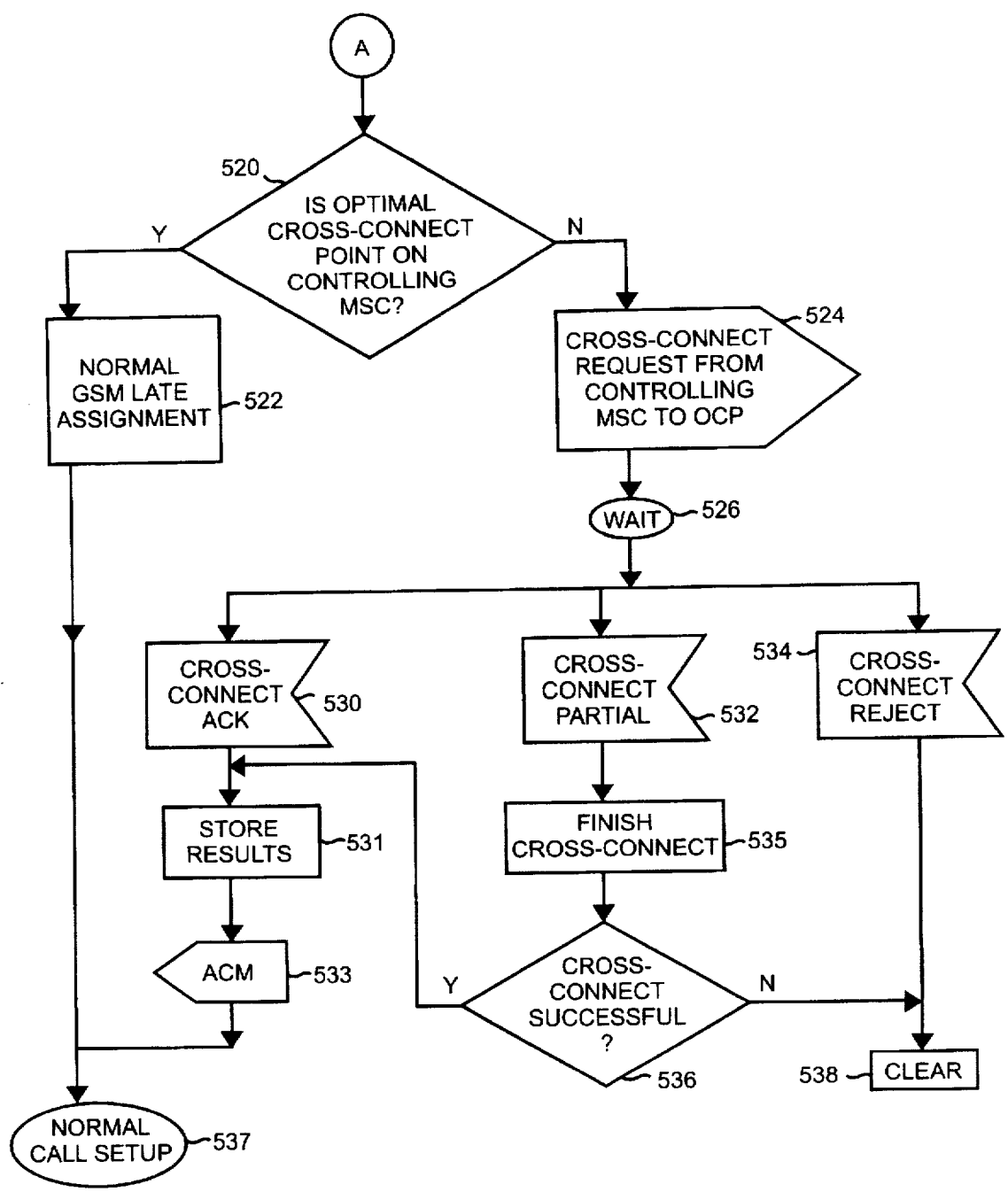
FIG. 3B is a continuation of FIG. 3A.

FIG. 3B is a continuation of FIG. 3A. In block 520 of FIG. 3B, the method determines whether the OCP calculated in block 518 is the same as the MSC that receives the IAM message in block 502, i.e. the controlling MSC. In one embodiment, the determination in block 520 may be as simple as a comparison between the node number of the OCP with the node number of the MSC that receives the IAM message in block 502. If it is, the controlling MSC itself is the optimum cross-connection point, and the method proceeds to block 522 to execute the assignment that was deferred in block 510 using normal GSM procedures for cross-connection of the incoming and the outgoing call paths at the MSC level. The above mentioned normal GSM procedures are known in the art and reference may be made to, for example, the GSM references mentioned herein for additional background information. Thereafter, the method proceeds to block 537, representing the normal call set up. In block 537, the call setup proceeds in a normal fashion.

On the other hand, if the MSC that receives the IAM message in block 502 is not itself the OCP, the method proceeds to delegate the actual task of connection cross-connecting to another cross-connection node, typically downward toward a subsystem at a lower level of the private network hierarchy, e.g. a BSS, a BSC, or a BTS. In block 524, the controlling MSC that receives the IAM message in block 502 (and as determined in block 520 as not the OCP) sends the CROSS-CONNECT REQUEST to the OCP, which is determined in block 518. At this point, the OCP is no longer the controlling MSC and may represent a subsystem at a lower level in the network hierarchy.

In block 526, the method waits for the cross-connection nodes of the private network, including the OCP, to attempt to make the end-to-end connection cross-connect. The message returned to the controlling MSC is either a CROSS-CONNECT ACKNOWLEDGE (received from the OCP in block 530), a CROSS-CONNECT PARTIAL (received in block 532 from a downstream OCP that tried to complete the end-to-end connection cross-connect and failed and assigning the controlling MSC as the OCP) or a CROSS-CONNECT REJECT (received in block 534 from an OCP that tried to complete the end-to-end connection cross-connect and failed).

It should be noted that the messages received in blocks 530, 532, and 534 may come from a node in the private network, currently designated the OCP, that may be different from the node originally designated the OCP in block 518. This case happens, for example, when there are insufficient resources in the nodes of the originally designated optimum end-to-end connection to properly complete the end-to-end connection. When this happens, a node higher in the private network hierarchy may be used in the cross-connection, and the messages received in blocks 530, 532, and 534 may come therefrom. For a simplified, visual illustration of this case, reference may be made to, for example, FIG. 2A and particularly the call between MS units 306 and 308.

A CROSS-CONNECT ACKNOWLEDGE (block 530) indicates to the MSC that the connection is successfully completed. Following the receipt of a CROSS-CONNECT ACKNOWLEDGE message in block 530, the method proceeds to block 531 to store the connection result. In one embodiment, the sequence of connection nodes through which the end-to-end connection traverses and an identifier associating the call with that sequence of nodes for the duration of the call are stored. Storage of both the sequence of nodes representing the end-to-end connection and the identifier for the call permits the network to keep track of the end-to-end connection, to relate the MM session to the call path, and to clear the end-to-end connection (or part of it) when the call is ended, either normally or unexpectedly.

In block 533, the CC function in the controlling MSC sends out an Address Complete Message (ACM), responsive to a received ACM message in block 516, to the MM circuit that controls the origination MS unit, acknowledging that the complete telephone number dialed has been received and that a successful cross-connect has been performed. Thereafter, the method proceeds to block 537, representing the normal call set up.

A CROSS-CONNECT PARTIAL message (block 532) indicates that the proper resources were not available at nodes downstream from the controlling MSC to complete the end-to-end connection. This situation may occur since the topology information known to the routing agent, e.g. the CC circuit of the controlling MSC that determines the optimum end-to-end connection in block 518, may be different from the actual state of the system By way of example, a required TRAU resource that the routing agent thought exists on a node may in reality be defective or removed altogether since information regarding that resource was last updated in the topology information database. As another example, hardware/software failures of some resources may not have been timely updated with the topology information database, thereby causing the routing agent to specify an optimum end-to-end connection that in reality is unrealizable.

Figure 4A:
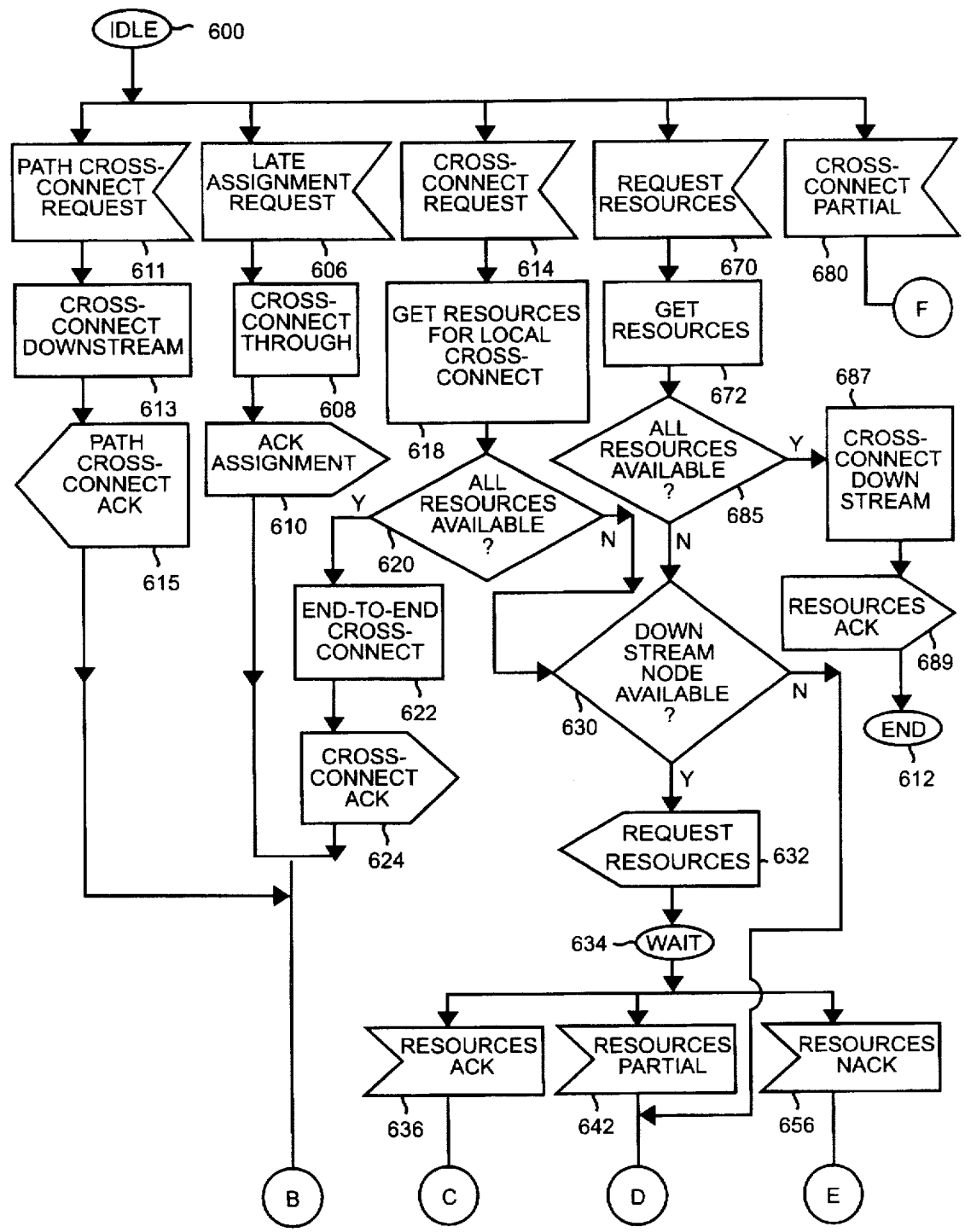
FIG. 4A shows in a simplified flowchart format the steps taken by nodes other than the controlling MSC to effect the distributed intelligence that facilitate the connection cross-connect between the incoming and the outgoing paths at a lower level cross-connect node in the private network hierarchy.
Figure 4B:
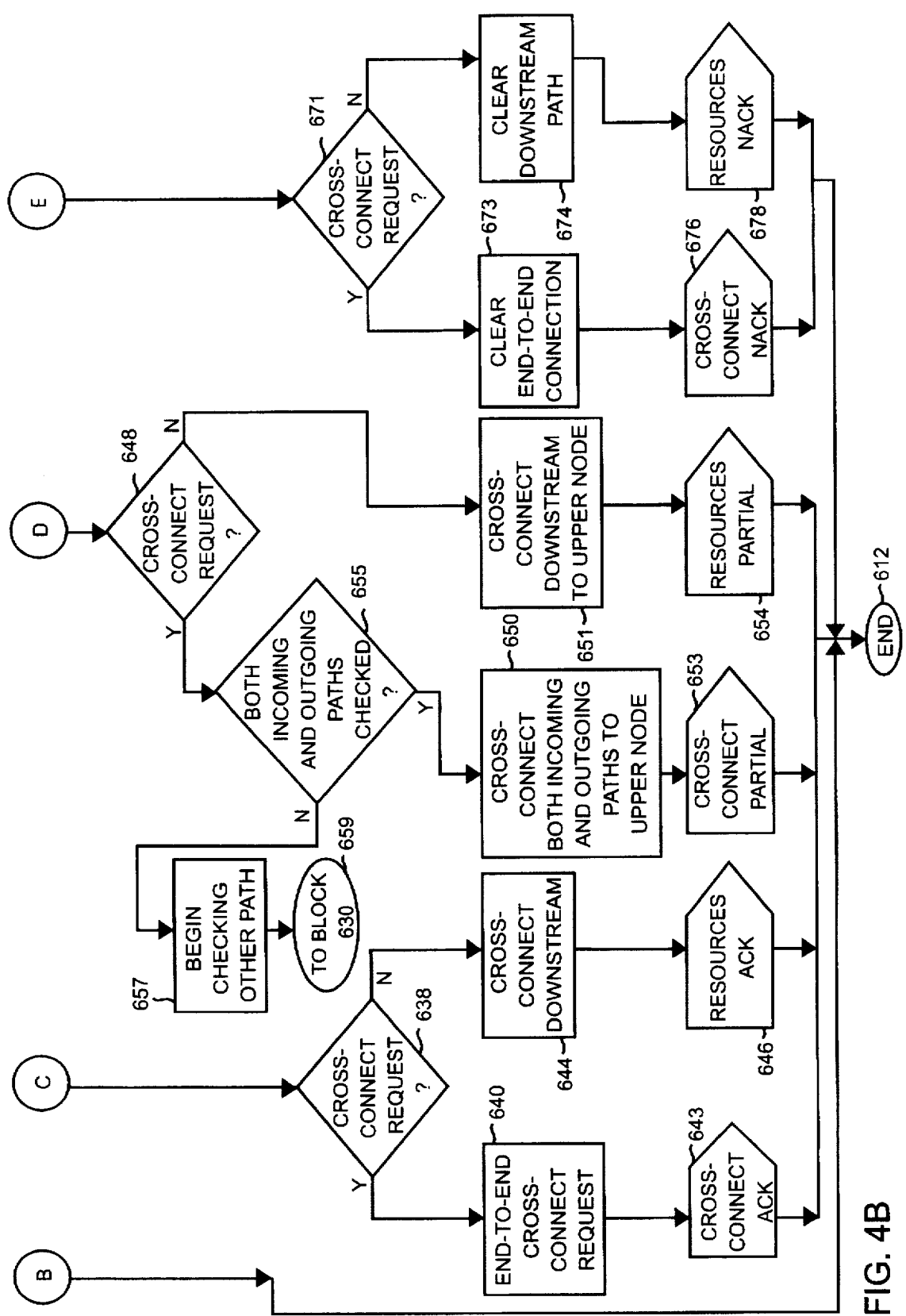
FIG. 4B is a continuation of FIG. 4A.
Figure 4C:
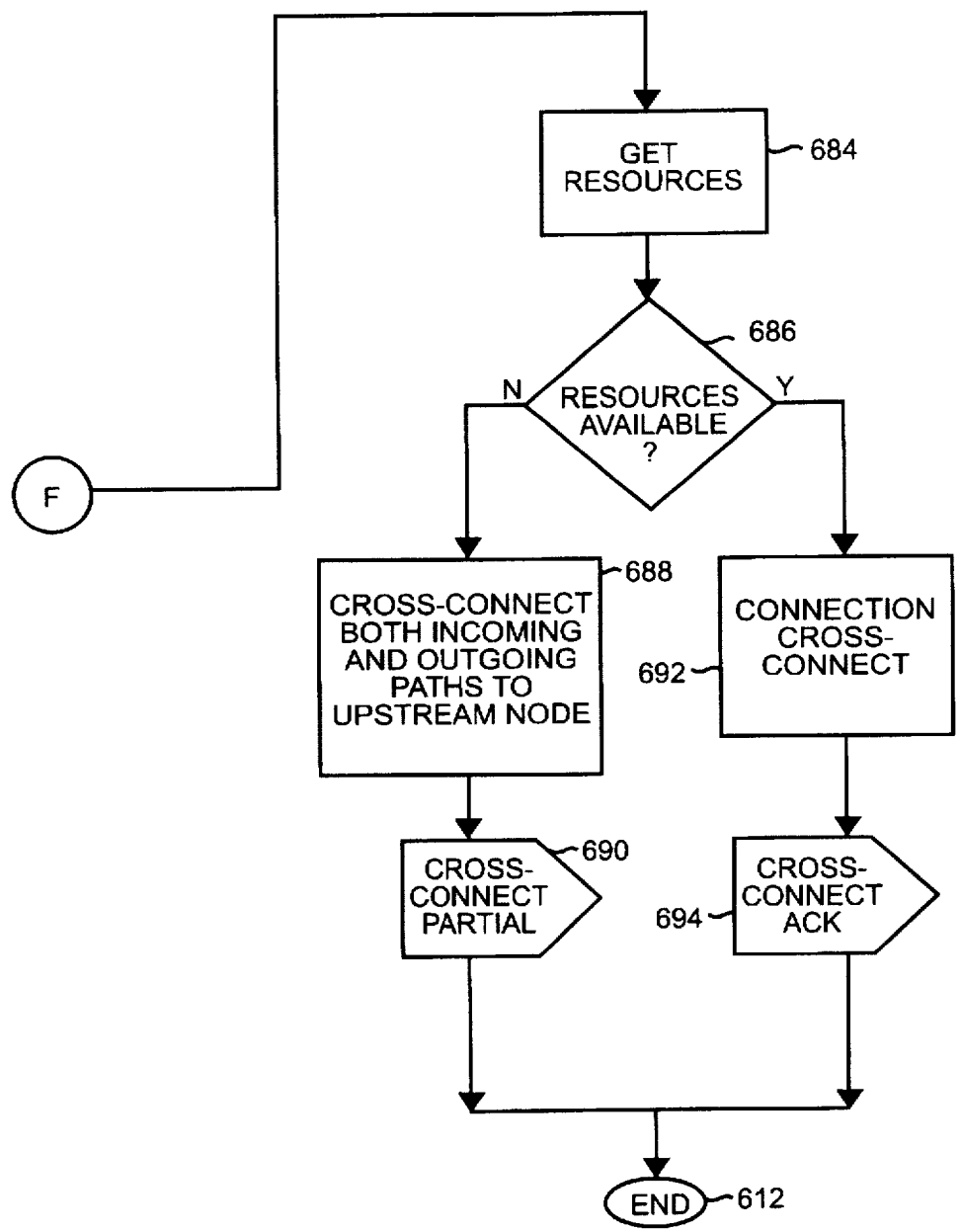
FIG. 4C is also a continuation of FIG. 4A.

As will be seen in FIGS. 4A, 4B, and 4C, an OCP will try to get resources from downstream nodes in the outgoing and incoming paths to properly complete the end-to-end connection if resources are not available right at that OCP node. If there are insufficient resources at both that OCP node and at nodes downstream from it in the outgoing and incoming paths, that OCP will try to use resources of a node upstream from it to complete the end-to-end connection. When that OCP signals to the upstream node that it needs to use the resources of the upstream node to complete the end-to-end connection, it sends a CROSS-CONNECT PARTIAL message to the upstream node. The upstream node then becomes the new OCP. In some cases, the upstream node may not have the required resources and must try to find resources at a still more upstream node. The process may continue if resources continue to be unavailable until the upstream node is the MSC itself When this happens, all nodes below the MSC has failed to find the required resources to complete the end-to-end connection, and the MSC, using its resources, represents the last chance to complete the connection.

In block 535, the controlling MSC itself attempts to complete the end-to-end connection cross-connect using the resources available to it. If the end-to-end connection cross-connect attempt is successful (as determined in block 536) the method proceeds to block 531 to store the results and then to block 533 to send out the ACM message to the MSC in the manner discussed earlier. On the other hand, if the end-to-end connection cross-connect is unsuccessful (as determined in block 536), the method proceeds to block 538 wherein the MM sessions associated with both the origination MS unit and the destination MS unit are cleared. In block 538, the call has failed.

In block 534, a CROSS-CONNECT REJECT message indicates to the controlling MSC that there has been a total failure of cross-connection. A cross-connect reject situation may occur when, due to events beyond the control of the network, the end-to-end connection is simply unrealizable. Examples include unavailable bandwidth at one of the cross-connect nodes along the end-to-end connection, hardware or software failures, or unavailability of resources. From block 534, the method proceeds to block 538 wherein the connection is cleared as described above.

FIGS. 4A, 4B, and 4C, which are continuations of one another, show in a simplified flowchart format the steps taken by nodes other than the controlling MSC, i.e. one that determines the optimum end-to-end connection in FIG. 3A, to effect the distributed intelligence that facilitate the connection cross-connect between the incoming and the outgoing paths at a lower level cross-connect node in the private network hierarchy. In FIGS. 4A, 4B, and 4C, the node originally designated the OCP first tries to use resources available on node to complete the end-to-end connection. If there are insufficient resources right on node, the originally designated OCP will try to get resources from downstream nodes in the outgoing and incoming paths to properly complete the end-to-end connection. If there are insufficient resources at both the originally designated OCP and at nodes downstream from it in the outgoing and incoming paths, the originally designated OCP will try to use resources of a node upstream from it to complete the end-to-end connection. When this happens, the end-to-end cross-connection will occur through the node upstream from the originally designated OCP. Further, the upstream node now represents the OCP where the cross-connecting between the incoming path and the outgoing path occurs.

To illustrate, consider the call between MS units 306 and 308 of FIG. 2A. For the purpose of illustrating the present point, assume that the call between MS units 306 and 308 requires rate adaptation from 8 Kbits 16 Kbits. When BTS 338 of FIG. 2A which for the purpose of illustrating the present point represents the originally designated OCP, realizes that it does not have the required 8 Kbits–16 Kbits TRAU circuit on node to complete the end-to-end connection, it first attempts to look downstream to find this required resource. Since there are no resources downstream in this case, BTS 338, representing the originally designated OCP, then attempts to find resources at a node upstream, i.e. BSC 328, to complete the connection. If there is a 8 Kbits–16 Kbits TRAU circuit at BSC 328, BSC 328 becomes the new OCP for completing the end-to-end connection through which the connection cross-connect between the incoming and outgoing paths occurs.

In implementing intelligent switching, the procedure shown in FIGS. 4A, 4B, and 4C replaces the sending of the Assignment Request message to the BSC from the MSC for the both incoming and the outgoing call paths. FIG. 4A starts at block 600 wherein all nodes are idle with respect to cross-connecting the voice/data path through their nodes.

Block 606 represents one of the possible messages involved in building the voice/data path. In block 606, it is determined that the MSC is the proper point to perform the connection cross-connect, i.e. between the incoming path and the outgoing path, and that no intelligent delegation of the cross-connect task to a cross-connect node lower in the private network hierarchy is needed. In blocks 608–610, the normal GSM late assignment and end-to-end cross-connection is performed. For example, block 606 receives the late assignment request from the CC function in the controlling MSC. The cross-connect of the downstream path in accordance with conventional GSM downstream path cross-connect is performed at block 608, and the Acknowledge Assignment message is sent to the CC circuit associated with the controlling MSC block 610. Thereafter, the method proceeds to block 612 where the nodes are done cross-connecting for the connection.

Block 614 also represents one other possible message involved in the intelligent cross-connecting process. In block 614, the CROSS-CONNECT REQUEST message is received by the OCP from the controlling MSC, requesting the OCP to perform the end-to-end connection cross-connect. In block 618, the OCP obtains, if possible, the necessary resources on node for performing the cross-connect, e.g. TRAU resources and other inter-working functions (IWF's) as appropriate. In block 620 the method ascertains whether the OCP has available on node all the resources required to perform the end-to-end connection cross-connect. In one embodiment, block 620 involves a check of the resources that are available at the OCP. If the required resources are available at the OCP (as determined in block 620) the method proceeds to block 622 where the full duplex cross-connection between the MS units via the OCP (the end-to-end connection cross-connect) is performed. The end-to-end connection cross-connect between the origination MS unit and the destination MS unit is explained in greater detail in, for example, FIG. 7. If resources are required, the present invention, in accordance with a preferred aspect, advantageously switches them in as necessary. For further information regarding the inventive switching in of resources when required at cross-connect nodes, reference may be made to, for example, the above-mentioned commonly assigned, co-pending patent application entitled "Cellular Private Branch Exchanges" (U.S. Ser. No. 08,435,709) and "Cellular Base Station with Intelligent Call Routing" (U.S. Ser. No. 08,434,598). Thereafter, the method proceeds to block 624 wherein the OCP sends a CROSS-CONNECT ACKNOWLEDGE message back to the MSC to indicate that the end-to-end connection has been successfully cross-connected at the OCP. From block 624 of FIG. 4A, the method proceeds to block 612 of FIG. 4B where the nodes are done cross-connecting for the connection.

On the other hand, if there are insufficient resources available at the OCP (as determined in block 620) the method proceeds to block 630 to ascertain whether there is a cross-connect node downstream (at a lower level in the network hierarchy) in either the incoming or the outgoing call path. In one embodiment, the incoming call path is first checked for availability of downstream nodes. If there are none downstream in the incoming path direction or if those nodes have insufficient resources, the method then proceeds to check the outgoing path for availability of nodes and resources. Only when there are insufficient resources in the nodes of both the incoming call path and the outgoing call path does the method conclude that there are insufficient resources downstream of the OCP to properly complete the end-to-end connection.

If there is a cross-connect node downstream (as determined in block 630) the method proceeds to block 632 wherein the OCP requests resources from the cross-connect node downstream The REQUEST RESOURCES message requests the node downstream from the OCP to ascertain whether the required resources are available downstream to complete the required end-to-end connection cross-connect.

In block 634, the method waits for the response from the node downstream from the OCP to which it has just sent the REQUEST RESOURCES message.

Depending on the resources available downstream, one of following three responses may return from the node downstream of the OCP: resources available (RESOURCES ACK), resources only partially available (RESOURCES PARTIAL) and no resources available (RESOURCES NACK).

In block 636, the method receives, responsive to a REQUEST RESOURCES message sent at block 632 (to a downstream node), a RESOURCES ACK message. The RESOURCES ACK message indicates that the required resources for completing the end-to-end connection are available at nodes downstream from the node that sends out the REQUEST RESOURCES message at block 632 and receives the RESOURCES ACK message at block 636.

From block 636 of FIG. 4A, the method proceeds to block 638 FIG. 4B. The response of the method in subsequent blocks 638–646 of FIG. 4B depends on what has happened thus far. If the node that sends out the REQUEST RESOURCES message at block 632 and receives the RESOURCES ACK message at block 636 is the same as the node that receives the CROSS-CONNECT REQUEST in block 614, the method, responsive to block 638 proceeds to block 640. On the other hand, if the node that sends out the REQUEST RESOURCES message at block 632 and receives the RESOURCES ACK message at block 636 is a node that has responded to a received REQUEST RESOURCES message (block 670), the method proceeds to block 644 from block 638.

In block 640, the method completes the end-to-end connection cross-connect by cross-connecting the incoming call path with the outgoing call path. In one embodiment, if the incoming and the outgoing paths are not already built, the method further directs the downstream nodes to build them as well. For further information regarding the building of incoming and outgoing paths, reference may be made to, for example, FIG. 11. Following block 640, the method proceeds to block 643 where it returns a CROSS-CONNECT ACK message to the controlling MSC. In one embodiment, the CROSS-CONNECT ACK message sent in block 643 may be received in, for example, block 530 of FIG. 3B. Further, the method proceeds to block 612 where the steps of FIGS. 4A, 4B, and 4C end for this node.

In block 644, however, the method has ascertained that the node that sends out the REQUEST RESOURCES message at block 632 and receives the RESOURCES ACK message at block 636 is a downstream node that has responded to a received REQUEST RESOURCES message (block 670). In this case, the method proceeds from block 638 to block 644 wherein the method cross-connects the downstream path between the MS unit and the facilities going to the upstream node that sent it the RESOURCES ACK message. Thereafter, the method proceeds to block 646 wherein it returns a RESOURCES ACK to the upstream node (which is received in block 636).

As is apparent, the RESOURCES ACK message is passed from a downstream node to an upstream node and the incoming or outgoing path is cross-connected between the downstream node and the upstream node until the upstream node is the same as the node that receives the CROSS-CONNECT REQUEST in block 614, sends out the REQUEST RESOURCES message at block 632, and receives the RESOURCES ACK message at block 636. When this happens, the method branches from block 638 to blocks 640 and 643, where the incoming and outgoing paths are cross-connected together and a CROSS-CONNECT ACK message is sent to the controlling MSC (which is received in block 530 of FIG. 3B). Further, the method proceeds to block 612 where the steps of FIGS. 4A, 4B, and 4C end for this node.

In block 642 of FIG. 4A, a node may receive, responsive to a REQUEST RESOURCES message that it sent to a downstream node in block 632, a RESOURCES PARTIAL message. The RESOURCES PARTIAL message indicates that the required resources are not available at the downstream node. From block 642 of FIG. 4A, the method proceeds to block 648 of FIG. 4B.

Once again, the response of the method in subsequent blocks 648–659 depends on what has happened thus far. If the node that sends out the REQUEST RESOURCES message at block 632 and receives the RESOURCES PARTIAL message at block 642 is the same as the node that receives the CROSS-CONNECT REQUEST in block 614, the method, responsive to block 648 proceeds to block 655. On the other hand, if the node that sends out the REQUEST RESOURCES message at block 632 and receives the RESOURCES PARTIAL message at block 642 is a downstream node that has responded to a received REQUEST RESOURCES message (block 670), the method proceeds to block 651 from block 648.

In block 655, the node that sends out the REQUEST RESOURCES message at block 632 and receives the RESOURCES PARTIAL message at block 642 is the same as the node that receives the CROSS-CONNECT REQUEST in block 614, and the method now needs to ascertain that all nodes downstream, both in the incoming path and the outgoing path, have been checked for resource availability. Consequently, the method proceeds to block 655 wherein it determines whether both incoming path and outgoing path have been checked for resource availability. This determination is necessary because at the point where the method branches from block 648 to block 655 for the first time, it is possible that only nodes downstream of one (not both) of the incoming and the outgoing paths have been checked.

If it is determined in block 655 that there is one more path to check for resource availability, the method branches from block 655 to block 657 wherein, as shown in FIG. 4B, the method begins to check the other path for resource availability. To do so, the method returns, as shown by the action indicated in block 659, to block 630 where the path that has not been checked heretofore is checked for resources.

On the other hand, if it is determined (via block 655) that both the incoming and the outgoing paths have been checked for resource availability, the method proceeds to block 650 wherein it cross-connects both the incoming and the outgoing paths to the upstream node. The upstream node that was cross-connected to in block 650 becomes the new OCP. In this manner, the method determines that downstream nodes in the determined optimum end-to-end connection have insufficient resources to properly complete the end-to-end connection and attempts to use resources at an upstream node to complete the task.

The method then proceeds to block 653 where it sends out a CROSS-CONNECT PARTIAL message to the upstream node. It should be noted that the upstream node that was cross-connected to in block 650 is, up to this point, uninvolved in the building of the end-to-end connection. Now, the upstream node receives the CROSS-CONNECT PARTIAL message in block 680.

After the incoming and outgoing paths are built to the upstream node and the CROSS-CONNECT PARTIAL message is sent out, the method proceeds to block 612, where the steps of FIGS. 4A, 4B, and 4C end for this node.

In block 651, however, the method has ascertained that the node that sends out the REQUEST RESOURCES message at block 632 and receives the RESOURCES PARTIAL message at block 642 is a downstream node that has responded to a received REQUEST RESOURCES message (block 670). In this case, the method proceeds from block 648 to block 651 wherein the method cross-connects the downstream node to an upstream node. Thereafter, the method proceeds to block 654 wherein it returns a RESOURCES PARTIAL message to the upstream node (which is received in block 642).

As is apparent, the RESOURCES PARTIAL message is passed from a downstream node to an upstream node and the method cross-connects the downstream node to the upstream node until the upstream node is the same as the node that receives the CROSS-CONNECT REQUEST in block 614, sends out the REQUEST RESOURCES message at block 632, and receives the RESOURCES PARTIAL message at block 642. When this happens, the method branches from block 648 to blocks 650 and 653, wherein the method cross-connects both the incoming and the outgoing paths to an upstream node and a CROSS-CONNECT PARTIAL message is sent to an upstream node (which is received in block 680). Further, the method proceeds to block 612, where the steps of FIGS. 4A, 4B, and 4C end for this node.

In block 656 of FIG. 4A, the method may receive, responsive to a REQUEST RESOURCES message that it sent to a downstream node in block 632, a RESOURCES NACK message. The RESOURCES NACK message indicates that an error condition has occurred and that it is impossible to build either the incoming or the outgoing call path. It should be noted that it is always possible in any system to have unanticipated error conditions. One source of unanticipated error conditions may involve a cross-connect failure due to limited resources, bandwidth, hardware/ software failures, and the like.

When a RESOURCES NACK message is received in block 656, the required resources are not available to realize the call. Once again, the response of the method in subsequent blocks 671–678 (see FIG. 4B) depends on what has happened thus far. If the node that sends out the REQUEST RESOURCES message at block 632 and receives the RESOURCES NACK message at block 656 is the same as the node that receives the CROSS-CONNECT REQUEST in block 614, the method, responsive to block 671 proceeds to block 673. On the other hand, if the node that sends out the REQUEST RESOURCES message at block 632 and receives the RESOURCES NACK message at block 656 is a downstream node that has responded to a received REQUEST RESOURCES message (block 670), the method proceeds to block 674 from block 671.

In block 673, the method clears both the incoming and the outgoing call paths. In other words, there is no way to complete the end-to-end connection and the method is clearing the end-to-end connection. The method then proceeds to block 676 where it sends out a CROSS-CONNECT NACK message to the controlling MSC. Thereafter, the method proceeds to block 652 where the nodes return to their idle state.

In block 674, however, the method has ascertained that the node that sends out the REQUEST RESOURCES message at block 632 and receives the RESOURCES NACK message at block 656 is a downstream node that has responded to a received REQUEST RESOURCES message (block 670). In this case, the method clears the downstream path. In other words, there is no way to complete the end-to-end connection and the method is clearing its part of the connection in block 674. The method then proceeds to block 678 where it sends out a RESOURCES NACK message to the upstream node. The RESOURCES NACK message sent in block 678 may be received, for example, in block 656. Thereafter, the method proceeds to block 652 where the nodes return to their idle state.

As is apparent, the RESOURCES NACK message is passed from a downstream node to an upstream node (block 678 to 656), and the method clears the paths downstream until the upstream node is the same as the node that receives the CROSS-CONNECT REQUEST in block 614, sends out the REQUEST RESOURCES message at block 632, and receives the RESOURCES NACK message at block 656. When this happens, the method branches from block 671 to blocks 673 and 676, wherein the method clears the connection leading to it and a CROSS-CONNECT NACK message is sent to the controlling MSC. In one embodiment, a version of the CROSS-CONNECT NACK message sent to the controlling MSC is received in, for example, block 534 of FIG. 3B. Further, the method proceeds to block 652, where the nodes return to their idle state.

As mentioned earlier, the REQUEST RESOURCES message sent in block 632 is received by a downstream node in block 670. At block 672, the downstream node from the upstream node that sent the REQUEST RESOURCES message in block 632 attempts to get resources on node to satisfy the resources requirement of the end-to-end connection. The process of attempting to get resources in block 672 involves, in one embodiment, of checking whether the resources on node satisfies the resources requirement sent via the REQUEST RESOURCES message.

From block 672, the method proceeds to block 685 wherein the method checks whether all resources required for a proper end-to-end connection cross-connect is satisfied, either by the downstream node alone or by a combination of nodes that includes the downstream node. If there are insufficient resources still, the method proceeds from block 685 to block 630 to ascertain whether there are additional nodes downstream so that the method may additionally check those additional downstream nodes for possible resources availability. From block 630, the method proceeds as earlier discussed.

On the other hand, if there are sufficient resources to complete the end-to-end connection cross-connect (as determined in block 685), the method proceeds from block 685 to block 687 where the downstream node is connected to the upstream node. Thereafter, the method proceeds to block 689 where it returns a RESOURCES ACK message to the upstream node. The RESOURCES ACK message sent in block 689 is received, in one embodiment, in block 636 by the upstream node. Thereafter, the method proceeds from block 636 in the manner earlier discussed. On the other hand, the downstream node proceeds, from block 689 to block 612 where the steps of FIGS. 4A, 4B, and 4C end for the downstream node.

As mentioned earlier, the CROSS-CONNECT PARTIAL message sent in block 653 is received by an upstream node in block 680. In block 680, the method proceeds to block 684 where the node attempts to get the needed resources. The process of obtaining resources in block 684 is analogous to that performed in block 618. From block 684, the method proceeds to block 686 wherein the method ascertains whether the resources required are available on this node. If there are resources to properly complete the end-to-end connection, the method proceeds to block 692 where the connection cross-connect, i.e. cross-connecting the incoming path with the outgoing path is performed. Thereafter, the method proceeds to block 694 to send a CROSS-CONNECT ACK message to the controlling MSC to inform the controlling MSC that the end-to-end connection has been built. The method then proceeds to block 612, where the steps of FIGS. 4A, 4B, and 4C end for this node.

On the other hand, if there are insufficient resources (as determined in block 686), the method proceeds to block 688 wherein both the incoming and the outgoing paths are again cross-connected to a more upstream node. In block 690, the node sends a CROSS-CONNECT PARTIAL to the upstream node to inform the upstream node that there are insufficient resources at lower levels of the hierarchy to complete the end-to-end connection and that the upstream node should get resources to attempt the cross-connect. The CROSS-CONNECT PARTIAL sent in block 690 may be received by the upstream node in, for example, block 680.

As is apparent, the CROSS-CONNECT PARTIAL message is passed from a downstream node to an upstream node where the upstream node attempts to complete the end-to-end connection (in blocks 684–694). The passing and attempting to complete the end-to-end connection by the nodes below the controlling MSC continues until the upstream node is the same as the controlling MSC. When this happens, the controlling MSC receives the CROSS-CONNECT PARTIAL message in block 532 of FIG. 3B where it makes an attempt to finish the cross-connect at block 535. Meanwhile, however, the method proceeds to block 612, where the steps of FIGS. 4A, 4B, and 4C end for this node.

Figure 5:
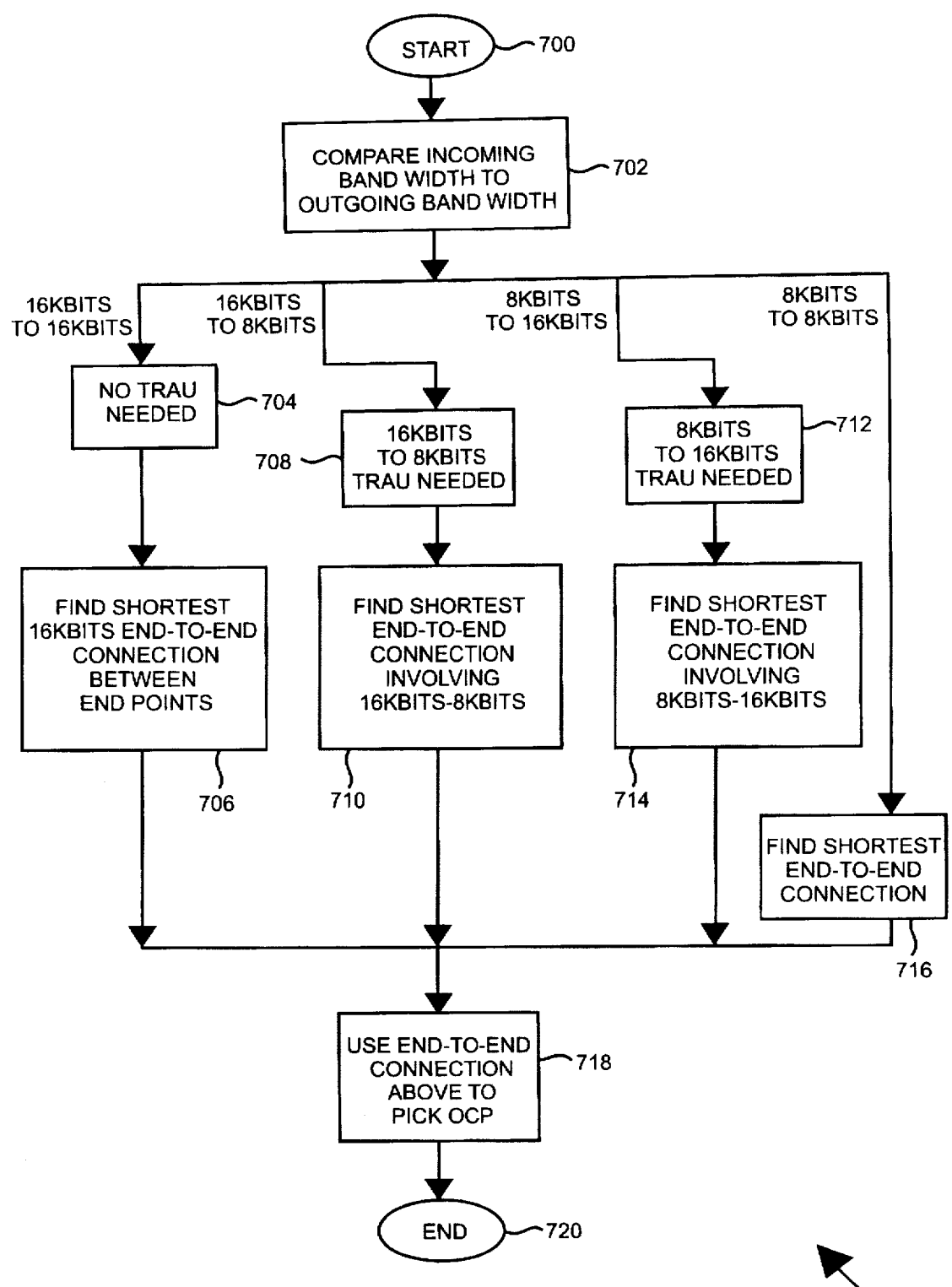
FIG. 5 shows in a simplified flowchart format the steps taken by the controlling MSC in calculating the optimal cross-connect point (OCP)

FIG. 5 shows in a simplified flowchart format the steps taken by the controlling MSC in calculating the optimum cross-connect point (OCP) of block 518 of FIG. 3A. FIG. 5 starts at block 700. In block 702, the MSC that is associated with the MM session for the outgoing call compares the bandwidth of the incoming path with the bandwidth of the outgoing path. The comparison in block 702 is made, in one embodiment, using the information from the outgoing call Initial Address Message (IAM) and the incoming call Address Complete Message (ACM'). The comparison carried out in block 702 may reveal, in one embodiment utilizing the GSM protocol, one of the following results: 1) a 16 Kbits to 16 Kbits call, 2) a 16 Kbits to 8 Kbits call, 3) a 8 Kbits to 16 Kbits call, or 4) a 8 Kbits to 8 Kbits call.

If both the incoming call and the outgoing call are at 16 Kbits, the method proceeds to block 704. It should be noted that when both the incoming path and the outgoing path are at 16 Kbits, the present invention advantageously utilizes no TRAU resources in one embodiment. For further information regarding the inventive TRAU avoidance aspect, reference may be made to a co-pending, commonly assigned patent application entitled "Cellular Base Station with Intelligent Call Routing" (U.S. Ser. No. 08/434,598). In this situation, the present invention, in accordance to a preferred aspect, advantageously avoids TRAUing the incoming and the outgoing paths to 64 Kbits before cross-connection. In contrast, the prior art TRAUs up both the incoming and the outgoing paths to 64 Kbits even for calls among 16 Kbits MS units.

Thereafter, the method proceeds to block 706 to find the shortest 16 Kbits end-to-end connection between end points, i.e. between the origination MS unit and the destination MS unit. In one embodiment, the determination of the shortest 16 Kbits end-to-end connection between the two end points of block 706 is performed using an algorithm by Dijkstra, discussed on, for example, pages 492 et seq. of *Data Communications, Computer Networks, and Open Systems* by Fred Halsall (Addison Wesley, 1992).

If the comparison in block 702 reveals that the incoming bandwidth is at 16 Kbits and the outgoing bandwidth is at 8 Kbits, the method proceeds to block 708, signifying that a 16 Kbits to an 8 Kbits TRAU is needed. From block 708, the method proceeds to block 710 wherein the method attempts to find the shortest end-to-end connection between the end points (the MS units) that involves a 16 Kbits to 8 Kbits TRAU resource. In one embodiment, the determination in block 710 also uses the search algorithm disclosed by the above-mentioned Halsall reference.

If the comparison in block 702 reveals that the incoming bandwidth is at 8 Kbits and the outgoing bandwidth is at 16 Kbits, the method proceeds to block 712, signifying that a TRAU resource for converting 8 Kbits to 16 Kbits is needed. In one embodiment, the resources used in blocks 708 and 712 represent the same circuitry, albeit using different inputs and outputs parameters. From block 712, the method proceeds to block 714 to find the shortest end-to-end connection between end points (the MS units) involving a 8 Kbits to 16 Kbits TRAU resources. In some cases, the rate conversion from 8 Kbits to 16 Kbits or vise versa may involve the conversion to 64 Kbits as an intermediate step. In one embodiment, the determination of the shortest end-to-end connection in block 714 utilized the above-mentioned Dijkstra search algorithm.

If the comparison in block 702 reveals that the incoming bandwidth is at 8 Kbits and the outgoing bandwidth is also at 8 Kbits, the method proceeds to block 716 to find the shortest end-to-end connection between the end points (MS units). Typically, when both the incoming path and the outgoing path are at 8 Kbits, no TRAU is needed. In some situations, however, if the bandwidth is asymmetrical, additional resources may be required for the harmonization of bandwidth as is known to those of skill in the art.

In one embodiment, the determination of the shortest end-to-end connection between end points in block 716 is performed using the aforementioned Dijkstra algorithm. It should be noted that the search algorithm used in blocks 706, 710, 714 and 716 preferably takes into account both the topology of the network (e.g., what cross-connect nodes are available in the network), as well as the resources that are available at each cross-connect node. Alternatively, any of the routing algorithm discussed in the following references may be used herein: Perlman, R. "Inteconnection: Bridges and Routers", Addison-Wesley, Reading, Mass., (1992); Deering S. E. "Multicast Routing in Internetworks and Extended LANs," Proc. SIGCOMM '88, Stanford, Calif. (August, 1988); Estrin, D. "Policy requirements for inter Administrative Domain Routing: RFC-1125," Internet Request for Comments, No. 1125, Network Information Center, November 1989. As mentioned earlier in connection with, for example, FIGS. 4A, 4B, and 4C, the present inventive method and apparatus, in one embodiment, advantageously includes techniques for dealing with incomplete or erroneous topological information. In one embodiment, the technique robustly searches for resources at nodes other than the originally designated OCP in order to attempt to complete the end-to-end connection cross-connect task.

From block 706, 710, 714 or 716, the method proceeds to block 718 wherein the method uses the end-to-end connection discovered via the above-mentioned blocks to pick the optimum cross-connect point (OCP). From block 718, the method proceeds to block 720, representing the end of the steps of FIG. 5.

Figure 6:
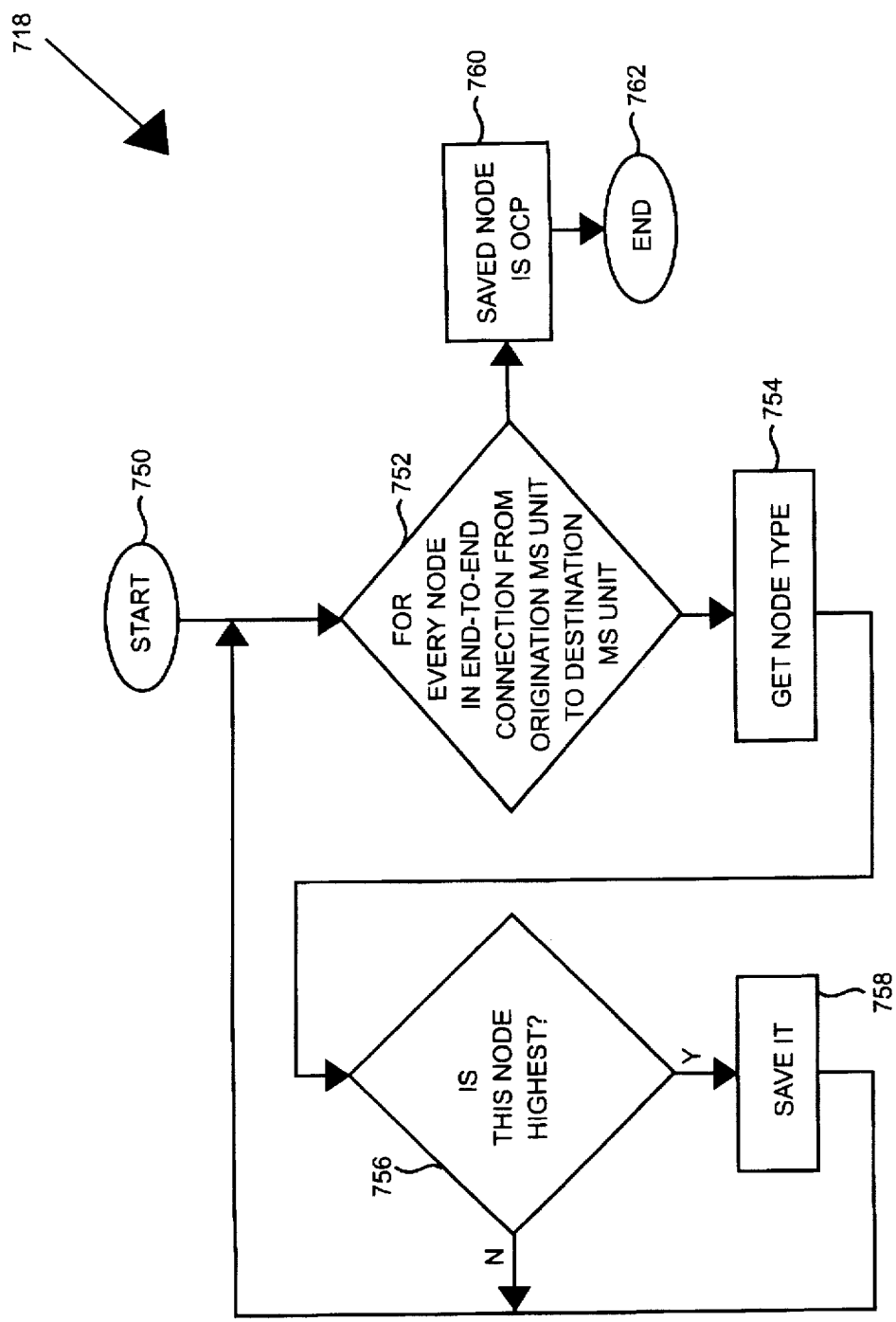
FIG. 6 shows in a simplified flowchart format the steps involved in using the optimal end-to-end connection discovered to pick the OCP.

FIG. 6 shows in a simplified flowchart format the steps involved in using the optimum end-to-end connection discovered to pick the OCP of block 718 of FIG. 5. FIG. 6 starts at block 750. From block 750, the method proceeds to block 752 wherein for every node in the theoretically determined end-to-end connection from the origination MS unit to the destination MS unit, the method gets its node type in block 754. In block 754, the node type may be one of a BTS, a BSC, a BSS, or a MSC.

In block 756, method determines whether the node chosen for examination in block 752 is the highest node in the end-to-end connection thus far. In block 756, the upstream-most node is considered the highest node (e.g. an MSC is considered higher than a BSC or a BSS, which is in turn considered higher than a BTS). If the node chosen for examination in this iteration is the highest node, the method proceeds to block 758 to temporarily save the highest node. On the otherhand, if the node chosen for examination in this iteration is not the highest node or after the highest node has been saved in block 758, the method proceeds to block 752 to continue with the next node in the end-to-end connection. The method continues until every node in the entire end-to-end connection is traversed. After the last cross-connect node is examined, the method proceeds to block 760 wherein the highest node that was temporarily saved in block 758 is designated the optimum cross-connect point (OCP). It should be noted that the OCP determined in block 758 is only theoretically determined based on topology data known to the MSC. As mentioned earlier, the method advantageously modifies, in one embodiment, the OCP if it turns out that the theoretically determined OCP is inappropriate for the end-to-end connection task.

It should be noted that if the network is a mesh-type network, there may be more than one single highest node. For example, if two BSC's are directly interconnected and they represent the highest cross-connect nodes that the end-to-end connection traverses, both BSC's are technically highest in the end-to-end connection. In this case, the method only saves the first BSC in one embodiment (if the comparison in block 756 is greater than) or the second BSC in another embodiment (if the comparison in block 756 is greater than or equal). In accordance with one aspect of the present invention, he inventive method applies regardless whether the first or the second BSC is considered the OCP. The OCP is determined to be the highest node along the theoretically determined optimum end-to-end connection in a hierarchical network or one of the highest nodes along that theoretically determined optimum end-to-end connection in a mesh-type network. From block 760, the method proceeds to block 762, representing the end of the steps of FIG. 6.

Figure 7:
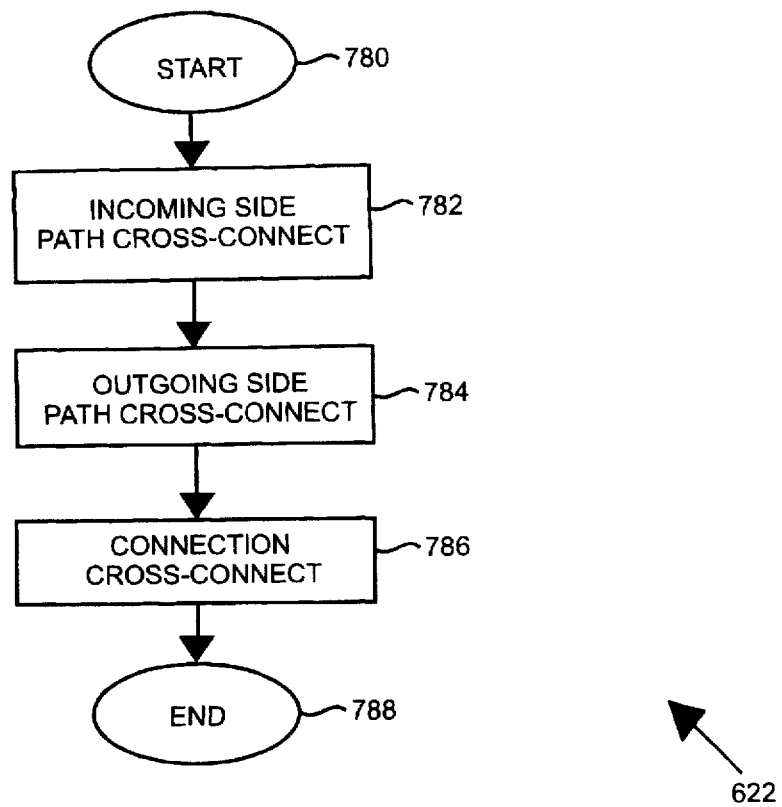
FIG. 7 shows in a simplified format the steps involved in performing the end-to-end connection cross-connect.

FIG. 7 shows in a simplified format the steps involved in the end-to-end connection cross-connect, which is shown at, for example, block 622 of FIG. 4A. It should be noted that the connection cross-connect point where connection cross-connect between the incoming and outgoing paths occurs is typically, but not necessarily performed at the originally designated OCP. This is because if the required resources are not available at both the originally designated OCP and at cross-connect nodes downstream of it, the method may bridge both the incoming and outgoing paths from the originally designated OCP to an upstream node (as discussed in connection with, for example, blocks 650 of FIG. 4B and 688 of FIG. 4C) to attempt the connection cross-connect at this new OCP. In block 622, it is necessary to complete the call path from the origination MS unit to the actual connection cross-connect point (which may or may not be the originally designated OCP) and down to the destination MS unit.

FIG. 7 starts at block 780. From block 780, the method proceeds to block 782 to complete the incoming path cross-connect, i.e. between the destination MS unit and the OCP (node where the incoming and the outgoing paths are actually cross-connected). Thereafter, the method proceeds to block 784 to complete the outgoing path cross-connect, i.e. between the OCP and the origination MS unit. The method then proceeds to block 786 to perform the connection cross-connect between the incoming path (connected in block 782) and the outgoing path (connected in block 784) across the OCP. Thereafter, the method proceeds to block 788, representing the end of the steps of FIG. 7.

Figure 8:
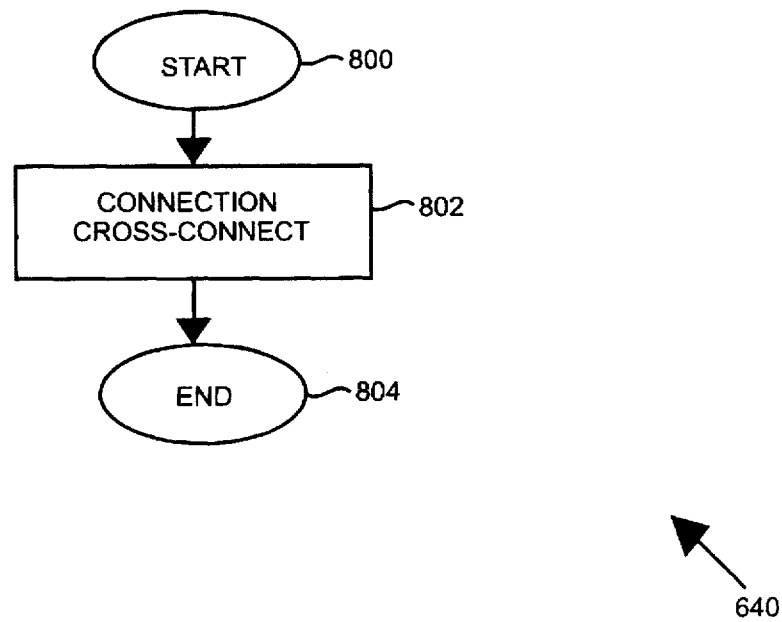
FIG. 8 shows in a simplified flowchart format the steps involved in performing a connection cross-connect between the incoming and outgoing paths.

FIG. 8 shows in a simplified flowchart format the steps involved in performing a connection cross-connect between the incoming and outgoing paths (shown in, for example, block 640 of FIG. 4B or block 692 of FIG. 4C). FIG. 8 starts at block 800. From block 800, the method proceeds to block 802 wherein it performs the connection cross-connect across the OCP, i.e. the actual cross-connection point between the incoming path and the outgoing path. Block 802 represents the connection cross-connecting between the incoming path and the outgoing path across the OCP although some or all of the required resources may be switched in at a downstream cross-connect node in the paths. This is because in FIGS. 4A, 4B, and 4C, the method may have found (via block 620) that it has insufficient resources at the designated OCP to complete the end-to-end connection, and it may have requested resources from a downstream node (block 632) to properly complete the end-to-end connection (block 636 and subsequent blocks). In one embodiment, both the incoming path and the outgoing path are already completed and available for connection cross-connecting, e.g. prior to block 640 of FIG. 4B. From block 802, the method proceeds to block 804, representing the end of the steps of FIG. 8.

Figure 9:
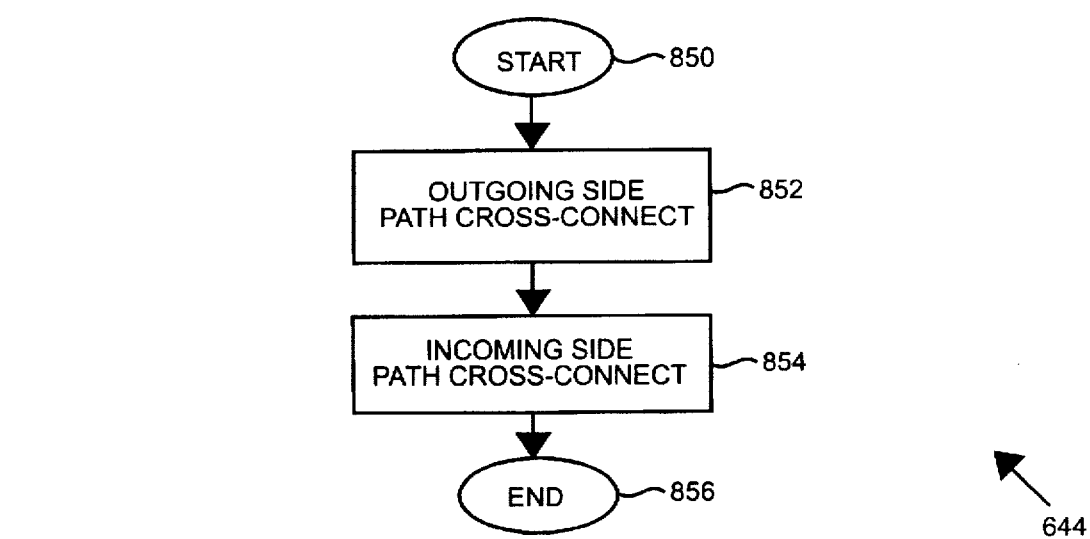
FIG. 9 shows in a simplified flowchart format the steps involved in building both the incoming and outgoing paths from a node to an upstream node.

FIG. 9 shows in a simplified flowchart format the steps involved in building both the incoming and outgoing paths from a node to an upstream node, e.g. shown in block 650 of FIG. 4B and block 688 of FIG. 4C. In FIG. 9, the OCP that realizes it needs to connect upstream for the purpose of using the resources at a upstream node to complete the end-to-end connection.

FIG. 9 starts at block 850. From block 850, the method proceeds to block 852 wherein the outgoing side path is cross-connected. In block 852, the method builds the path on the outgoing side between the facility to the upstream node and the downstream facility. The downstream facility may be either a facility to a downstream node, e.g. a BTS, or a facility to an MS unit, e.g. the transceiver itself In block 854, the method builds the path on the incoming side between the facility to the upstream node and the downstream facility. From block 854, the method proceeds to block 856, representing the end of the steps of FIG. 9.

Figure 10:
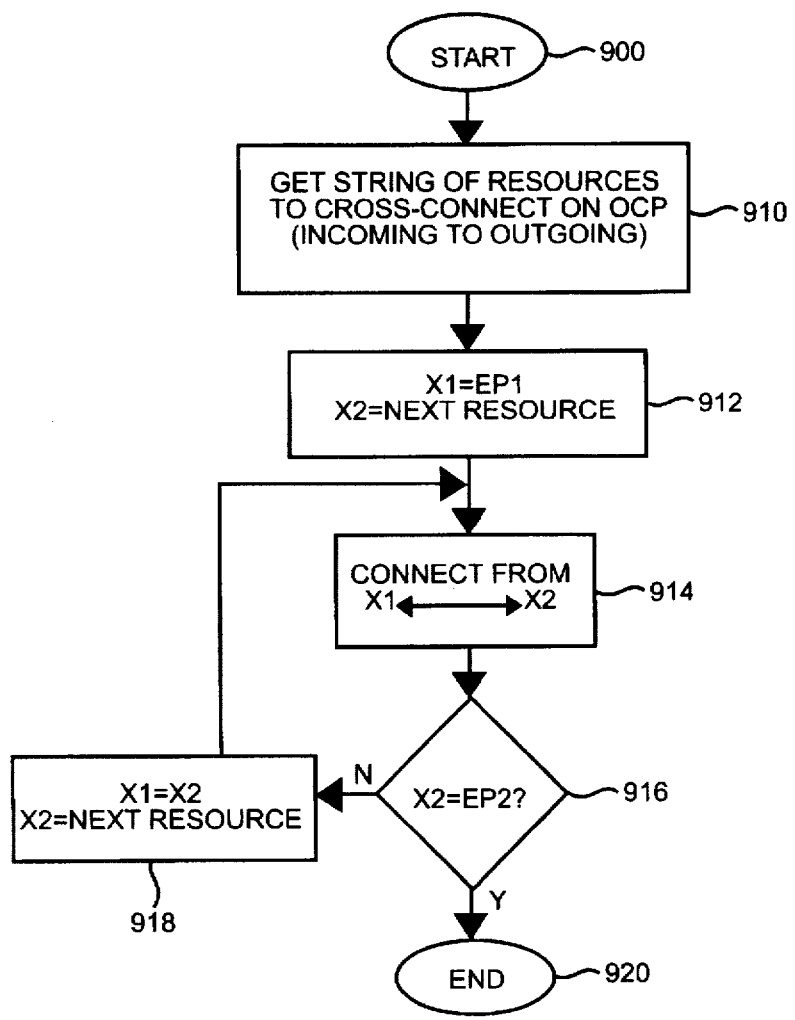
FIG. 10 shows in a simplified format the steps involved in performing the connection cross-connect across an OCP.

FIG. 10 shows in a simplified format the steps involved in performing the connection cross-connect across the OCP (shown in, e.g. block 786 and block 802). FIG. 10 starts at block 900. From block 900, the method proceeds to block 910 wherein the method obtains the string of required resources to be switched in at the OCP to properly complete the end-to-end connection. As mentioned previously, the resources that may be required include TRAU, echo canceler, certain packet servers for data calls, and the like.

From block 910, the method proceeds to block 912 wherein two temporary variables X1 and X2 are used to accomplish the connection cross-connect between the incoming call path and the outgoing call path across the OCP. In block 912, X1 is set to be equal to the end point of the incoming path while X2 represents the next resource in the connection through the OCP between the incoming path and the outgoing path. In block 914, the portion of the end-to-end connection that traverses through the OCP is connected from the point represented by temporary variable X1 to the point represented by temporary variable X2.

In block 916, the method checks to see whether X2 has reached EP2, representing the point where the outgoing path couples with the OCP. If X2 is not equal to EP2 (as determined in block 916) the method proceeds to block 918 wherein the point previously represented by temporary variable X2 is assigned to temporary variable X1, and X2 is now assigned to the point representing the next resource in the connection between the incoming path and the outgoing path across the OCP. Thereafter, the method returns to block 914 wherein it continues to connect between points X1 and X2.

If it is determined in block 916 that X2 now represents point EP2 (the point where the outgoing call path couples with the OCP), the portion of the end-to-end connection across the OCP from the incoming call path to the outgoing call path is now completely connected, and the method proceeds to block 920, representing the end of the steps of FIG. 10.

Figure 11:
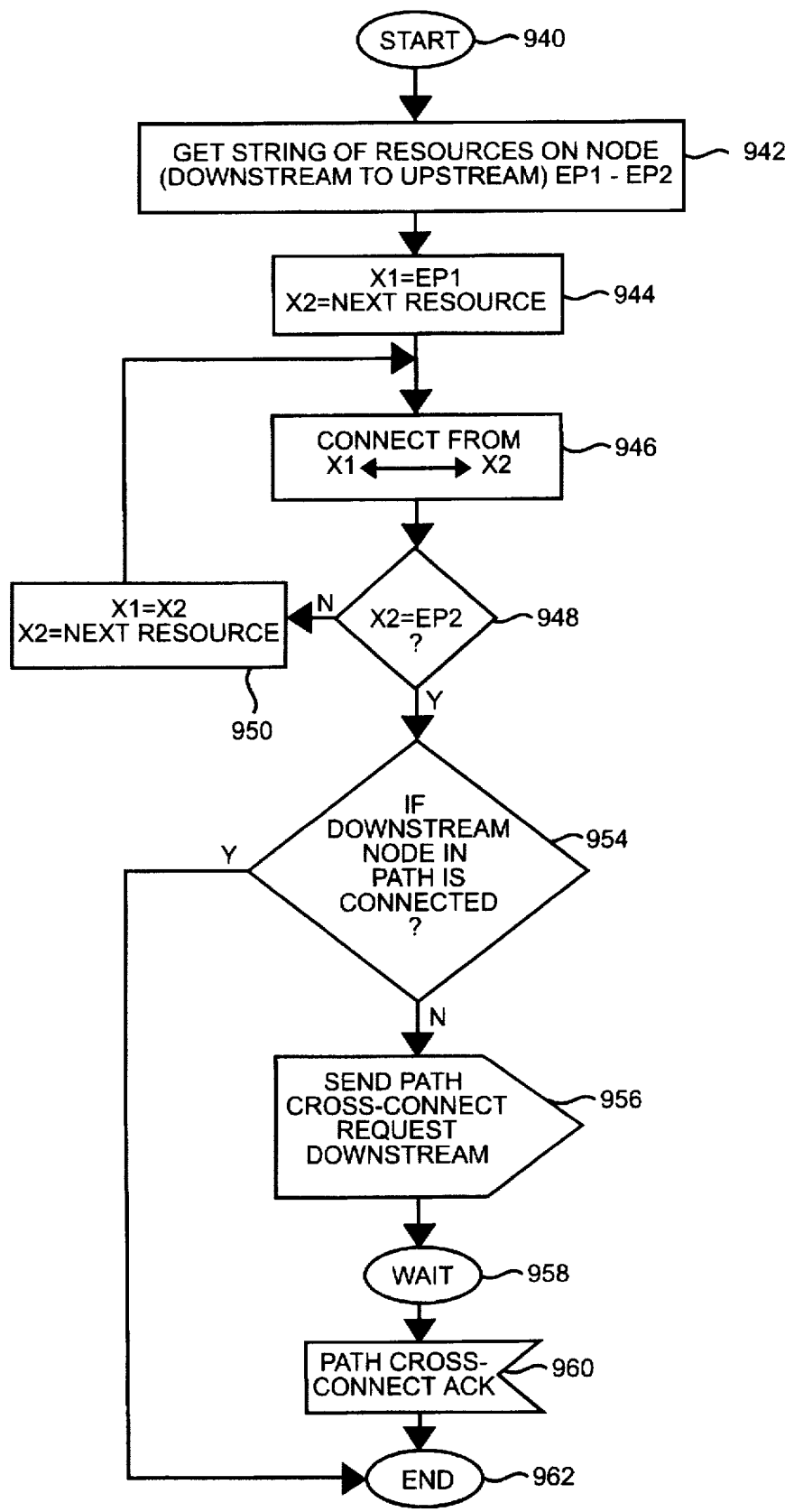
FIG. 11 shows in a simplified format the steps involved in cross-connecting a call path.

FIG. 11 shows in a simplified format the steps involved in cross-connecting a call path, e.g. shown in either block 644, 651, 782 784, 852, and 854. FIG. 11 applies whether the path cross-connection involves the incoming or the outgoing path. FIG. 11 covers the situation where a path needs to be built between either the origination MS unit or the destination MS unit and the current node.

FIG. 11 starts at block 940. From block 940, the method proceeds to block 942 to obtain the string of required resources, if any, on a cross-connect node along the call path (whether incoming or outgoing). As mentioned previously, the resources that may be required include TRAU, echo canceler, certain packet servers for data calls, and the like for the proper completion of the end-to-end connection.

From block 942, the method proceeds to block 944 wherein two temporary variables X1 and X2 are used to accomplish the path cross-connection between two end points across a cross-connect node along the call path. In the specific embodiment of FIG. 11, the downstream end of the node is connected to the upstream end although this is arbitrary. In block 944, X1 is set to be equal to the downstream end of the node while X2 represents the next resource in the call path toward the upstream end of the node. In block 946, the call path is connected from the point represented by temporary variable X1 to the point represented by temporary variable X2.

In block 948, the method checks to see whether X2 has reached EP2, representing the end of the string of resources within a cross-connect node in the call path. If X2 is not equal to EP2 (as determined in block 948), the method proceeds to block 950 wherein the point previously represented by temporary variable X2 is assigned to temporary variable X1, and X2 is now assigned to the point representing the next resource in the call path portion across a node from the downstream end to the upstream end. Thereafter, the method returns to block 946 wherein it continues to connect between points X1 and X2. As is apparent, blocks 942–950 represents the steps taken to cross-connect across one cross-connect node, including any resources utilized therein, in the call path.

If it is determined in block 948 that X2 now represents point EP2, the path across one cross-connect node in the call path, though whatever resources required, is connected. The method then proceeds to block 954 to determine whether the downstream node in the path is also connected. If the downstream node is already connected, the method proceeds to block 962, representing the end of the steps of FIG. 11.

On the other hand, if it is determined in block 954 that the downstream node in the path is not connected, the method proceeds to block 956 to send a PATH CROSS-CONNECT REQUEST message downstream to the downstream node. In one embodiment, the PATH CROSS-CONNECT REQUEST message is received by a node downstream at block 611 of FIG. 4A from the node that sends it. From block 611, the method proceeds to block 613 wherein the downstream node that receives the PATH CROSS-CONNECT REQUEST message at block 611 attempts to cross-connect at its downstream location. In one embodiment, the steps performed in block 613 involves invoking the method of FIG. 11 again for the downstream node. Once the portion of the call path through that node has been connected, the node will send out a PATH CROSS-CONNECT ACK message at block 615. In this manner, the method iteratively builds a path by connecting through each node in the path starting from the upstream most node in a path and working its way downward toward the MS unit.

In block 960, the downstream nodes return a PATH CROSS-CONNECT ACK message indicating that the desired path, all the way down to the MS unit, has been cross-connected. In block 962, the steps of FIG. 11 end.

Although the foregoing invention has been described in some detail for purposes of clarity of understanding, it will be apparent that certain changes and modifications may be practiced within the scope of the appended claims. By way of example, although the invention is discussed herein with reference primarily to a GSM system, it should be noted that the present invention is not so limiting. It is specifically contemplated that the cellular private branch exchanges disclosed herein may be implemented in systems using other specific protocols.

Further, although the invention is described using flowcharts as an illustration aid, it should be noted that the methods and apparatus of the present invention may be event-driven, capable of executing multiple processes at the same time. As such, different processes and process tasks do not necessarily have to be performed in the specific sequential order chosen for illustration, and a computer and/or software program implementing the inventive method may be executing other tasks while executing the inventive method disclosed herein.

Further, although the present invention uses communication between two MS units to illustrate the inventive concept, it should be noted that conference calls may be made among more than two MS units, e.g. among 3, 4 or more MS units. The adaptation of the disclosed apparatusses and methods to achieve that end is well within the abilities of one skilled in the art. Given this disclosure, it will be apparent to those of ordinary skills in the art that combinations and substitutions may be made without departing from the scope and the spirit of the present invention. Consequently, the scope of the invention is not limited to the specific examples given herein but is set forth in the appended claims.

APPENDIX A

| GLOSSARY OF TERMS AND ABBREVIATIONS | |
|---|---|
| Abis: | Protocol stack between a BTS and a BSC |
| ACM: | Address Complete Message |
| ANM: | Answer Message |
| BCF: | Base Station Control Function |
| BSC; | Base station Controller |
| BSS: | Base Station Subsystem |
| BTS: | Base Transceiver Station |
| CC; | Call Control Management |
| CCPU: | Cellular CPU |
| cPBX: | cellular Private Branch Exchange |
| DSP: | Digital Signal Processing |
| GMSC: | Gateway for MSC |
| GSM: | Global Systems for Mobile Communication |
| HLR: | Home Location Registry |
| IAM: | Initial Address Message |
| ISDN: | Integrated Services Digital Network |
| IWF: | Inter-Working Functions |
| LAPD-M: | Link Access Protocol on the Dm (control) channel |
| MM: | Mobility Management |
| MS: | Mobile Stations |
| MSC | Mobile-Services Switching Center |
| PSTN: | Public Switched Telephone Network |
| RF: | module Radio Frequency module |
| RL: | Radio Link |
| RR: | Radio Resource Management |
| SCCP: | Signaling Connection Control Part |
| SMS: | Short Message Services |
| SS: | Supplemental Services |
| TDM data: | Time Division Multiplexed Data |
| TRAU: | Transcoder-Rate Adapter Unit |
| TRX | Transceiver |
| VLR | Visitor Location Registry |
| VME | An industry standard bus for interconnecting components |
| wPBX | wired PBX |

APPENDIX B

Mouly, Michel & Pautet, Marie-Bernadette, "The GSM System for Mobile Communications", Mouly, Michel & Pautet, Marie-Bernadette, 1992.
European Telecommunications Standards Institute, "European digital cellular telecommunications system (Phase 2); Mobile radio interface signaling layer 3 General aspects (GSM 04.07)", 1994, Valbonne - France.
European Telecommunications Standards Institute, "European digital telecommunications system (Phase 2); Mobile radio interface layer 3 specification (GSM 04.08)", 1994, Valbonne - France.
European Telecommunications Standards Institute, "European digital cellular telecommunications system (Phase 2); Mobile-services Switching Centre - Base Station System (MSC - BBS) interface Layer 3 specification (GSM 08.08)", 1994, Valbonne - France.
European Telecommunications Standards Institute, "European digital cellular telecommunications system (Phase 2); Signaling transport mechanism specification for the Base Station System - Mobile-services Switching Centre (BBS - MSC) interface (GSM 08.06)", 1994, Valbonne - France.
European Telecommunications Standards Institute, "European digital cellular telecommunications system (Phase 2); Base Station Controller - Base Transceiver Station (BSC - BTS) interface Layer 3 specification (GSM 08.58)", 1994, Valbonne - France.
European Telecommunications Standards Institute, "European digital cellular telecommunications system (Phase 2); Mobile Application Part (MAP) specification (GSM 09.02)", 1994, Valbonne - France.
European Telecommunications Standards Institute, "European digital cellular telecommunications system (Phase 2); Signaling requirements on internetworking between the Integrated Services Digital Network (ISDN) or Public Switched Telephone Network (PSTN) and the Public Land Mobile Network (PLMN) (GSM 09.03)", 1994, Valbonne - France.

What is claimed is:

1. In a system having a plurality of cross-connect nodes for facilitating cellular communication among a plurality of mobile stations, a method of cross-connecting an end-to-end connection between an origination mobile station and a destination mobile station, comprising:

receiving call control information from said origination mobile station;

receiving call control information from said destination mobile station;

computing, responsive to said call control information received from said origination mobile station and said call control information received from said destination mobile station, an optimum end-to-end connection for cross-connecting said end-to-end connection, said optimum end-to-end connection having a first optimum cross connect point and representing a computed shortest communication route between said origination mobile station and said destination mobile station that satisfies resource requirements for cross-connecting said end-to-end connection, said first optimum cross-connect point being one of a mobile services switching center (MSC), a base station controller (BSC), and a base transceiver station (BTS); and if nodes along said end-to-end connection has sufficient resources to satisfy said resource requirements for cross-connecting said end-to-end connection, cross-connecting said end-to-end connection along said optimum end-to-end connection using said first optimum cross-connect point as a connection cross-connect point.

2. The method of claim 1 wherein said cellular communication via said end-to-end connection is accomplished via channels having a specified bit rate, said specified bit rate being an integer multiple of 8 Kbits.

3. The method of claim 1 wherein said cellular communication via said end-to-end connection is accomplished via sub-64 Kbit channels.

4. The method of claim 1 wherein said cellular communication via said end-to-end connection is accomplished without rate adaptation if said origination mobile station and said destination mobile station communicate at the same rate.

5. The method of claim 1 wherein said cellular communication via said end-to-end connection is accomplished without rate adaptation to 64 Kbits if said origination mobile station and said destination mobile station communicate at different sub-64 Kbits rates.

6. The method of claim 1 wherein said network represents a hierarchical network including said mobile services switching station, said base station controller, and said base transceiver station, wherein at least some resources for satisfying said resource requirements reside in one of said base station controller and base transceiver station.

7. The method of claim 6 wherein said at least some resources includes rate adaptation resources.

8. The method of claim 6 wherein said at least some resources includes echo canceling resources.

9. The method of claim 1 wherein said computing step further comprises the step of ascertaining resources in a topology table.

10. The method of claim 9 wherein said network represents a hierarchical network including said mobile services switching station, said base station controller, and said base transceiver station, wherein at least some resources in said topology table reside at one of said base station controller and said base transceiver station.

11. The method of claim 10 wherein said at least some resources includes rate adaptation resources.

12. The method of claim 10 wherein said at least some resources includes echo canceling resources.

13. The method of claim 10 wherein said topology table includes static resource configuration data of said network.

14. The method of claim 10 wherein said topology table includes dynamic resource configuration data of said network, said dynamic resource configuration data including data pertaining to resources at each node of said network and data pertaining to an operational status of said resources.

15. The method of claim 10 wherein said operational status includes data pertaining current usage level of said resources.

16. The method of claim 1 wherein said end-to-end connection includes said base station controller and another base station controller, said base station controller and said another base station controller representing highest nodes in said end-to-end connection.

17. An apparatus for facilitating cellular communication between an origination mobile station and a destination mobile station, comprising:

a mobile services switching center, said mobile services center having a first switching circuit for performing connection cross-connects for calls between said origination mobile station and said destination mobile station said mobile services switching center including a call control circuit for receiving call control information from said origination mobile station and said destination mobile station;

a base station controller coupled to said mobile services switching center, said mobile services switching center and said base station controller are coupled to a common backplane of a common chassis, said base station controller having a second switching circuit for performing connection cross-connects for calls between said origination mobile station and said destination mobile station; and a base transceiver station coupled to said base station controller, said base transceiver station having a third switching circuit for performing connection cross-connects for calls between said origination mobile station and said destination mobile station, wherein said call control circuit determines, responsive to said call control information received from said origination mobile station and said destination mobile station, at which of said mobile services switching center, base station controller, and base transceiver station an optimum cross connect point for cross-connecting an end-to-end connection between said origination mobile station and said destination mobile station resides.

18. An apparatus for facilitating cellular communication between an origination mobile station and a destination mobile station, comprising:

a mobile services switching center, said mobile services center having a first switching circuit for performing connection cross-connects for calls between said origination mobile station and said destination mobile station said mobile services switching center including a call control circuit for receiving call control information from said origination mobile station and said destination mobile station;

a base station controller coupled to said mobile services switching center, both said mobile services switching center and said base station controller being implemented via a single processor, said base station controller having a second switching circuit for performing connection cross-connects for calls between said origination mobile station and said destination mobile station; and a base transceiver station coupled to said base station controller, said base transceiver station having a third switching circuit for performing connection cross-connects for calls between said origination mobile station and said destination mobile station, wherein said call control circuit determines, responsive to said call control information received from said origination mobile station and said destination mobile station, at which of said mobile services switching center, base station controller, and base transceiver station an optimum cross connect point for cross-connecting an end-to-end connection between said origination mobile station and said destination mobile station resides.

19. An apparatus for facilitating cellular communication between an origination mobile station and a destination mobile station, comprising:

a call control circuit, said call control circuit receiving call control information from said origination mobile station and said destination mobile station;

a mobile services switching center coupled to said call control circuit, said mobile services switching center having a first switching circuit for performing connection cross-connects for calls between said origination mobile station and said destination mobile station, said mobile services switching center being configured for coupling with a base station controller having a second switching circuit for performing connection cross-connects for calls between said origination mobile station and said destination mobile station, said base station controller being configured for coupling with a base transceiver station having a third switching circuit for performing connection cross-connects for calls between said origination mobile station and said destination mobile station, wherein said call control circuit determines, responsive to said call control information received from said origination mobile station and said destination mobile station, at which of said mobile services switching center, base station controller, and base transceiver station an optimum cross connect point for cross-connecting an end-to-end connection between said origination mobile station and said destination mobile station resides and wherein said optimum cross connect point is employed as a highest node in said end-to-end connection if there are sufficient resources on nodes along said end-to-end connection to facilitate said cellular communication.

20. A mobile services switching center configured for coupling to a cellular network having a base station controller and a base transceiver station, said mobile services switching center facilitates cellular communication between an origination mobile station and a destination mobile station, comprising:

a first circuit configured for receiving at said mobile services switching center call control information from said origination mobile station;

a second circuit configured for receiving at said mobile services switching center call control information from said destination mobile station;

a third circuit configured for computing, responsive to said call control information received from said origination mobile station and said call control information received from said destination mobile station through said first circuit and said second circuit respectively, an optimum connection point for cross-connecting an end-to-end connection, said computed optimum connection point represents one of said mobile services switching center, base station controller, and base transceiver station, said end-to-end connection representing a computed shortest communication route that satisfies resource requirements for enabling said cellular communication between said origination mobile station and said destination mobile station; and a fourth circuit configured for sending instructions to said computed optimum connection point to enable said end-to-end connection to be cross-connected at said computed optimum connection point if said end-to-end connection, when cross-connected at said computed optimum connection point, in fact contains all necessary resources for enabling said cellular communication between said origination mobile station and said destination mobile station.

21. In a base station controller configured for coupling to a cellular network having a mobile services switching center and a base transceiver station, a method for facilitating cellular communication between an origination mobile station and a destination mobile station, comprising:

receiving at a first circuit from said mobile services switching center cross-connect data, said cross-connect data identifying whether said base station controller is designated a computed optimum cross-connection point for cross connecting an end-to-end connection between said origination mobile station and said destination mobile station, said end-to-end connection, when cross-connected at said computed optimum cross-connection theoretically represents the shortest communication route between said origination mobile station and said destination mobile station that satisfies resource requirements for enabling cellular communication between said origination mobile station and said destination mobile station; and cross-connecting, using a switching circuit at said base station controller, an incoming path with an outgoing path, thereby completing said end-to-end connection if resources at nodes along said incoming path and outgoing path satisfy said resource requirements, said incoming path representing a path between said base station controller and said origination mobile station, said outgoing path representing a path between said base station controller and said destination mobile station.

22. The method of claim 21 wherein said resources include rate adaptation resources.

23. The method of claim 22 wherein said resources further include echo-canceling resources.

24. The method of claim 22 wherein said resources exist at said base station controller.

25. The method of claim 22 wherein at least some of said resources exist at a node below said base station controller along said incoming path and said outgoing path.

26. The method of claim 22 wherein said end-to-end connection is cross-connected at a higher node in said network than said base station controller irrespective whether said cross-connect data designates said base station controller said computed optimum cross-connection point if said end-to-end connection lacks said resource requirements to enable said cellular communication if cross-connected at said base station controller.

27. The method of claim 21 wherein said at least one of said nodes along said incoming path and said outgoing path represents said base transceiver station.

28. The method of claim 21 wherein said end-to-end connection includes another base station controller connected to said base station controller, said base station controller and said another base station controller representing highest nodes in said end-to-end connection.

29. A base station controller configured for coupling to a cellular network having a mobile services switching center and a base transceiver station, and for facilitating cellular communication between an origination mobile station and a destination mobile station, comprising:

a first circuit configurable for receiving from said mobile services switching center cross-connect data, said cross-connect data identifying whether said base station controller is designated a computed optimum cross-connection point for cross connecting an end-to-end connection between said origination mobile station and said destination mobile station, said end-to-end connection, when cross-connected at said computed optimum cross-connection theoretically represents the shortest communication route between said origination mobile station and said destination mobile station that satisfies resource requirements for enabling cellular communication between said origination mobile station and said destination mobile station; and a switching circuit coupled to said first circuit, said switching circuit configurable for cross-connecting an incoming path with an outgoing path, thereby completing said end-to-end connection if resources at nodes along said incoming path and outgoing path satisfy said resource requirements, said incoming path representing a path between said base station controller and said origination mobile station, said outgoing path representing a path between said base station controller and said destination mobile station.

30. The base station controller of claim 29 wherein said required resources include one of a rate adaptation resource and an echo canceling resource.

31. The base station controller of claim 29 wherein said first circuit and said switching circuit are controlled by digital instructions from a digital processor.

* * * * *